(12) United States Patent
Yang et al.

(10) Patent No.: US 12,418,462 B2
(45) Date of Patent: Sep. 16, 2025

(54) METHODS AND APPARATUSES FOR NETWORK FUNCTION DISCOVERY

(71) Applicant: Telefonaktiebolaget LM Ericsson (publ), Stockholm (SE)

(72) Inventors: Yong Yang, Kållered (SE); Yunjie Lu, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/704,288

(22) PCT Filed: Oct. 24, 2022

(86) PCT No.: PCT/EP2022/079523
§ 371 (c)(1),
(2) Date: Apr. 24, 2024

(87) PCT Pub. No.: WO2023/072801
PCT Pub. Date: May 4, 2023

(65) Prior Publication Data
US 2024/0348514 A1    Oct. 17, 2024

(30) Foreign Application Priority Data
Oct. 25, 2021 (WO) ............... PCT/CN2021/126078

(51) Int. Cl.
*H04L 41/50* (2022.01)
*H04L 67/51* (2022.01)

(52) U.S. Cl.
CPC .......... *H04L 41/5058* (2013.01); *H04L 67/51* (2022.05)

(58) Field of Classification Search
CPC ..................... H04L 41/5058; H04L 67/51
See application file for complete search history.

(56) References Cited

U.S. PATENT DOCUMENTS

| | | | |
|---|---|---|---|
| 12,207,104 B2 * | 1/2025 | Sapra | H04W 24/02 |
| 2022/0286949 A1 * | 9/2022 | Sapra | H04W 48/16 |

(Continued)

OTHER PUBLICATIONS

ETSI, Technical Specification, 5G, 5G System, Network function repository services. Stage 3 (Apr. 2019) (Year: 2019).*

(Continued)

*Primary Examiner* — Jerry B Dennison
(74) *Attorney, Agent, or Firm* — Rothwell, Figg, Ernst & Manbeck, P.C.

(57) ABSTRACT

A method (400) performed by an NF service consumer. The method includes invoking (s402) a discovery service for discovering NF service producers. Invoking the discovery service comprises: generating (s404) a discovery message (253) comprising a query; and transmitting (s406) to an NRF (204), the discovery message comprising the query. The query included in the discovery message (253) comprises a first query parameter comprising a first NF type value identifying an NF type of a target NF being discovered. The query further comprises at least one of: i) a second query parameter comprising a supported features value specifying that the NF service consumer invoking the discovery service supports selection of combined NFs, or ii) a third query parameter comprising a second NF type value identifying a set of one or more NF types. The third query parameter indicates either a) that the NF service consumer prefers the NRF to return a set of NF instance profiles wherein each NF instance profile included in the set is for an NF instance that supports all of the NF types identified by the first and second NF type values.

16 Claims, 6 Drawing Sheets

(56) References Cited

U.S. PATENT DOCUMENTS

| | | | | |
|---|---|---|---|---|
| 2023/0179669 A1* | 6/2023 | Yang | ................... | H04W 8/005 |
| | | | | 709/201 |
| 2023/0261953 A1* | 8/2023 | Lu | ........................ | H04L 67/56 |
| | | | | 709/223 |
| 2024/0064212 A1* | 2/2024 | Rodrigo | .............. | H04L 67/1012 |
| 2024/0334323 A1* | 10/2024 | Ozturk | .............. | H04W 52/0206 |
| 2024/0348514 A1* | 10/2024 | Yang | ....................... | H04W 8/00 |

OTHER PUBLICATIONS

International Search Report and Written Opinion issued in International Application No. PCT/EP2022/079523 dated Jan. 17, 2023 (10 pages).

Ericsson et al., "MB-UPF registration and discovery", 3GPP TSG-CT WG4 Meeting #106-e, C4-215164, E-Meeting, Oct. 11-15, 2021 (77 pages).

Samsung et al., "MB-SMF registration and discovery—Updates", 3GPP TSG-CT WG4 Meeting #106-e, C4-215438, E- Meeting, Oct. 11-15, 2021 (30 pages).

3GPP TS 23.247 V17.0.0 (Sep. 2021) (94 pages).

3GPP TS 29.510 V17.3.0 (Sep. 2021) (271 pages).

* cited by examiner

METHODS AND APPARATUSES FOR NETWORK FUNCTION DISCOVERY

CROSS REFERENCE TO RELATED APPLICATIONS

This application is a 35 U.S.C. § 371 National Stage of International Patent Application No. PCT/EP2022/079523, filed 2022 Oct. 24, which claims priority to International Patent Application No. PCT/CN2021/126078, filed on 2021 Oct. 25. The above-identified applications are incorporated by this reference.

TECHNICAL FIELD

Disclosed are embodiments related to network function (NF) discovery.

BACKGROUND

FIG. 1 illustrates an exemplifying wireless communication system 100 represented as a 5G network architecture comprising an Access Network (AN) (e.g., a Radio AN (RAN)) and a Core network (CN) comprising network entities in the form of Network Functions (NFs). Typically, the AN comprises base stations, e.g., such as evolved Node Bs (eNBs) or 5G base stations (gNBs) or similar. As shown in FIG. 1, user equipments (UEs) connect to an AN as well as an Access and Mobility Management Function (AMF). As further shown in FIG. 1, the 5G CN NFs include: a Network Slice Selection Function (NSSF), an Authentication Server Function (AUSF), a Unified Data Management (UDM), an Access and Mobility Management Function (AMF), a Session Management Function (SMF), a Policy Control Function (PCF), an Application Function (AF), and a NF Repository Function (NRF).

The NRF supports the following functionality: 1) maintains the NF instance profile of available NF instances and their supported services; 2) allows other NF instances to subscribe to, and get notified about, the registration in NRF of new NF instances of a given type; and 3) supports a discovery function. The NRF can receive a set of one or more query parameters ("query") from an NF instance, use the query to identify NF instances that match the query, and respond to the query by transmitting to the NF instance that sent the query the NF instance profiles for the NF instances that matched the query. Features of the NRF are specified in 3GPP Technical Specification (TS) 29.510 V17.3.0 (hereafter "TS 29.510").

A number of 5G core network NFs of different types are always instantiated per default in the 5G core network, e.g., such as an AMF, a NRF, a PCF and a SMF etc. Other 5G core network NFs may be instantiated as needed and several NFs of the same type can also be instantiated if required, e.g., to distribute load to additional NF(s) of the same type. Thus, an NF instance may be seen as an example or a specimen of a certain NF. Herein, the terms NF and NF instance are used interchangeably, unless otherwise expressly stated or is apparent from the context in which the terms are used. An NF instance exposes one or more NF Service Instances.

Registration Procedure

A core network NF instance in the service based 5G core network registers its NF instance profile (or "NF profile" or "profile" for short) at the NRF. That is, the registering NF instance sends a registration request to the NRF, which request comprises the profile of the registering NF instance. The profile is typically included in the request as a JavaScript Object Notation (JSON) object or other similar data object. The profile indicates the one or more NF services that are supported by the registering NF instance. Generally, a profile may comprise one or more of the following attribute values for the registering NF: NF type identifier, fully qualified domain name (FQDN) or IP address, name(s) of supported service(s), etc. The NRF stores the profile of the registering NF and preferably marks the registering NF instance as available. The registration may take place when the NF instance becomes operative for the first time or upon an activation of an individual NF service within the NF instance, e.g., triggered after a scaling operation. The NF instance may register/expose one or more NF services.

Discovery

When a first NF instance (also referred to as an "NF service consumer") intends to utilize an NF service supported by a second NF instance (also referred to as an "NF service producer"), the first NF instance will initiate an NF discovery process (a.k.a., NF service discovery process) with the NRF. Thus, the NF service consumer (e.g., an SMF, an AMF, etc.) sends a discover request to the NRF, which request comprises discovery information (e.g., a query). The discovery information may be included in the request as a JSON data object (e.g., file) or similar. The discovery information may indicate a target NF type (e.g., the discovery information may include the following attribute-value-pair: target-nf-type=X). Generally, the target NF type may e.g., be any of NSSF, NEF, AUSF, AMF, PCF, SMF, UDM or AF or similar. Upon receiving the query, the NRF determines a set of one or more NF instances that match the query sends to the NF service consumer a response to the discovery request (a.k.a., "query response").

Discovery of Combo Nodes

Some NF service producers support multiple NFs. For example, an NF service produce may support both SMF and Multicast/Broadcast (MB) SMF (MB-SMF) functionality or the NF service producer may support both UPF and MB-UPF functionality. That is, for example, one NF service producer may comprise bother an SMF and an MB-SMF, and another NF service producer may comprise both a UPF and an MB-UPF. Such an NF service producer is also called a "combo NF", "combined NF", "combo node", or "combination node". 3GPP Technical Document (Tdoc) C4-215438 describes one way in which an NF service consumer can discover combo nodes.

SUMMARY

Certain challenges presently exist. For instance, there is no efficient mechanism for discovering an NF service producer supporting multiple NFs (i.e., a combo node)). For example, the procedure disclosed in Tdoc C4-215438 is not scalable and requires the NRF to implement complicated logic.

Accordingly, in one aspect there is provided a method performed by an NF service consumer. The method includes invoking a discovery service for discovering NF service producers. Invoking the discovery service comprises: generating a discovery message comprising a query; and transmitting to an NRF, the discovery message comprising the query. The query included in the discovery message comprises a first query parameter comprising a first NF type value identifying an NF type of a target NF being discovered. The query further comprises at least one of: i) a second query parameter comprising a supported features value specifying that the NF service consumer invoking the discovery service supports selection of combined NFs, or ii) a third query parameter comprising a second NF type value identifying a set of one or more NF types. The third query parameter indicates either a) that the NF service consumer prefers the NRF to return a set of NF instance profiles wherein each NF instance profile included in the set is for an NF instance that supports all of the NF types identified by the first and second NF type values or b) that the NF service consumer is requesting the NRF to only return a set of NF instance profiles wherein each NF instance profile included in the set is for an NF instance that supports all of the NF types identified by the first and second NF type values.

In another aspect there is provided a computer program comprising instructions which when executed by processing circuitry of a network node causes the network node to perform any one of the methods disclosed herein. In another aspect there is provided a carrier containing the computer program, wherein the carrier is one of an electronic signal, an optical signal, a radio signal, and a computer readable storage medium. In another aspect there is provided a network node, where the network node is configured to perform any one of the methods disclosed herein. In some embodiments, the network node includes processing circuitry and a memory containing instructions executable by the processing circuitry, whereby the network node is configured to perform any one of the methods disclosed herein.

An advantage of the embodiments disclosed herein is that they enable an NRF to efficiently discover combo NFs. That is, the embodiments are scalable and do not require complicated logic to implement.

BRIEF DESCRIPTION OF THE DRAWINGS

The accompanying drawings, which are incorporated herein and form part of the specification, illustrate various embodiments.

DETAILED DESCRIPTION

Disclosed are embodiments in which an NF service producer 201 (see FIG. 2) can indicate in its NF instance profile sent to an NRF 204 that the NF service producer supports multiple network functionalities, i.e. multiple NF types (i.e., the NF service producer is a combo node). For instance, in one embodiment a new information element (IE) (e.g., an attribute-value-pair (AVP)) is added to the NF service producer's NF profile (the name of the AVP may be "addNfTypeList" and the value of the AVP is an NF type identifier or an array (e.g., list) of NF type identifiers). Accordingly, the profile may identify multiple NF types supported by the NF service producer (e.g., a first NF type identified by the value of the nfType attribute of the profile and one or more other NF types identified by the value of the addNfTypeList attribute).

In some embodiments, an NF service consumer 202 can indicate to the NRF that the NF service consumer prefers that the NRF return a list of combo nodes. For example, in one embodiment the query parameters that NF service consumer 202 sends to the NRF may include an AVP with the name "preferred-additional-nf-type" and with a corresponding value that comprises one more NF type identifiers. For example, the query parameters may include the following query parameter: "preferred-additional-nf-type=X,Y,Z."

In other embodiments, an NF service consumer 202 can indicate to the NRF that the NF service consumer requires that the NRF only return a list of combo nodes. For example, in one embodiment the query parameters that NF service consumer 202 sends to the NRF may include an AVP with the name "additional-nf-type" and with a corresponding value that comprises one more NF type identifiers. For example, the query parameters may include the following query parameter: "additional-nf-type=Y."

Figure 1:
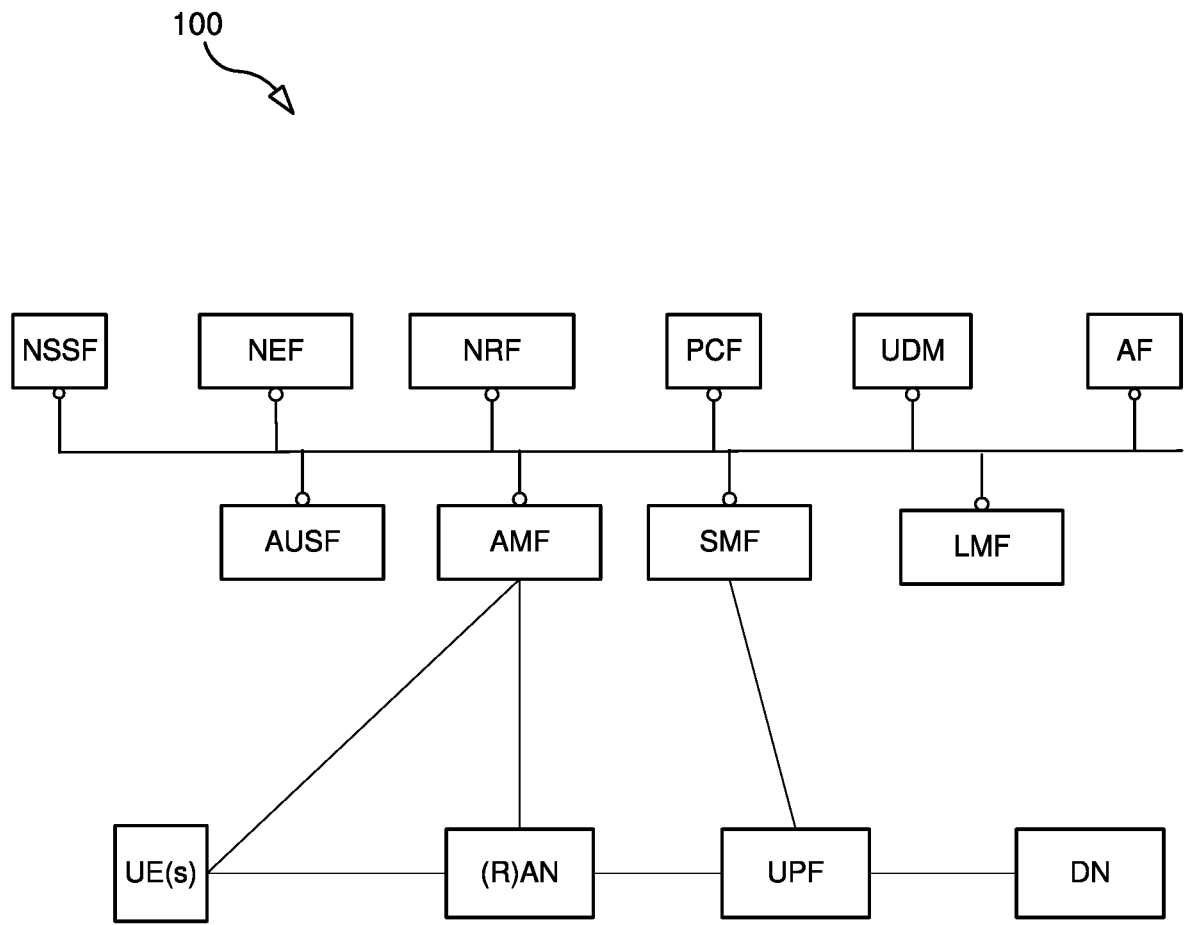
FIG. 1 illustrates an exemplifying wireless communication system.
Figure 2:
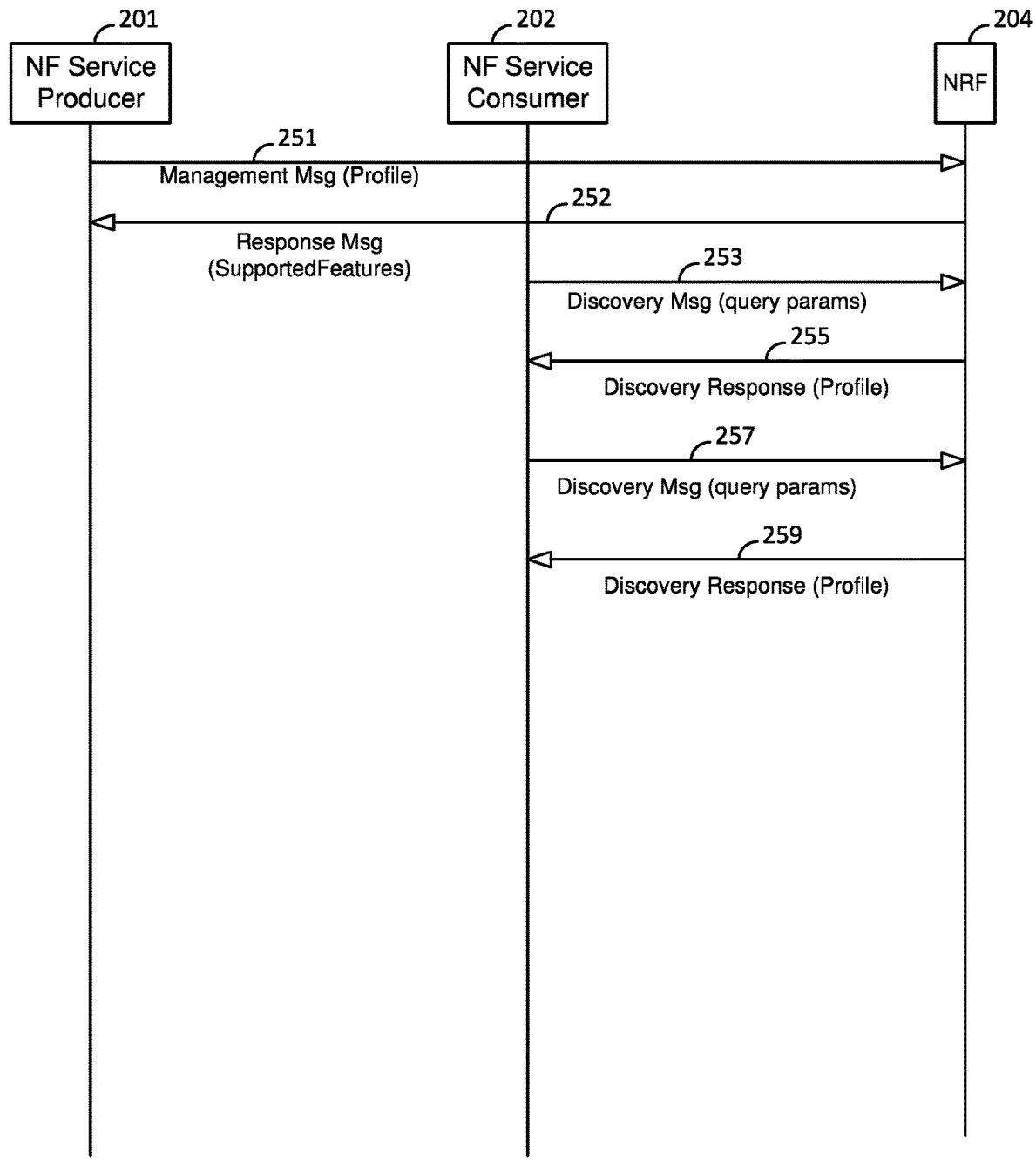
FIG. 2 is a message flow diagram illustrating a message flow according to an embodiment.

FIG. 2 is a message flow diagram illustrating a message flow according to an embodiment. The message flow may begin with an NF service producer 201 (or "NF 201" for short) transmitting to NRF 204 a management message 251 (e.g., a registration message). The management message includes a profile for NF service producer 201. For example, service consumer may invoke the NRFRegister operation described in TS 29.510. That is, transmitting the management message 251 to the NRF may consist of NF service producer 201 transmitting to NRF 204 a Hypertext Transfer Protocol (HTTP) PUT message that comprises an NFProfile for the service consumer.

In one embodiment, the profile included in the management message 251 comprises not only an "nfType" value, which identifies an NF type supported by NF 201, but also another value that identifies one or more additional NF types supported by NF 201. That is, for example, the profile may contain the following IEs: 1) nfType=X and 2) addNfTypeList=Y,Z). In this example, the profile for NF 201 that NF 201 supports the following NF types: X, Y, and Z. Additional IEs that may be included in the profile are shown and described in Table 1 of the appendix.

The message flow may include NRF 204 responding to message 251 by transmitting to NF service producer 201 a response message 252. The response message 252 may include information (e.g., a "supportedFeatures" attribute value) that indicates that the NRF 204 supports managing additional NF type(s) in the NF profile. That is, the NRF may indicate to NF 201 that the NRF supports the "addNf-TypeList" attribute.

The message flow may also include NF service consumer 202 (or "NF 202" for short) transmitting a discovery message 253 to NRF 204, the discovery message 253 includes query parameters. For example, NF 202 may invoke the NFDiscover operation described in TS 29.510. That is, transmitting the discovery message 253 to the NRF may consist of NF 202 transmitting to NRF 204 an HTTP GET message that comprises the query parameters.

In one embodiment, the query parameters included in discovery message 253 include not only a target-nf-type value (i.e., an NF type identifier), which indicates an NF type of the target NF being discovered, but also another value that indicates to the NRF 204 that NF 202 supports selection of a combo NF (e.g., an NF that supports NF types as defined in the nfType and addNfTypesList attributes in the NF profile). Additional query parameters that may be included in the discovery message 253 are identified in Table 2 of the appendix.

In response to discovery message 253, NRF 204 transmits to NF 202 a discovery response message 255 that may comprise one or more NF profiles that match all the query parameters. If the query parameters include the value indicating that NF 202 supports combo node selection, then any profile will match the target-nf-type query parameter so long as either: 1) the nfType value of the profile is identical to the target-nf-type value or 2) an NF type identifier included in the addNfTypeList value is identical to the target-nf-type value. Thus, for example, if the query includes target-nf-type=X, then a profile with nfType=Z and addNfTypeList=Y, X will match the target-nf-type query parameter. The discovery response message 255 may also include supported feature information indicating that NRF 204 supports selection of combo nodes.

The message flow may also include NF service consumer 202 transmitting to NRF 204 another discovery message (e.g., discovery message 257). In one embodiment, the query parameters included in discovery message 257 include not only the target-nf-type value, but also another value that comprises one or more additional NF type identifiers. This other value may be the preferred-additional-nf-types value or the additional-nf-types values described above.

In response to discovery message 257, NRF 204 transmits to NF 202 a discovery response message 259 that may comprise one or more NF profiles that match all the query parameters. The discovery response message 259 may also include supported feature information indicating that NRF 204 supports selection of combo nodes.

If the query parameters of message 257 include the additional-nf-type value, then each profile included in response message 259 must be a profile for an NF instance that: 1) supports the NF type identified by the target-nf-type value and 2) also supports each NF type identified by the additional-nf-type value.

Thus, for example, if the query includes target-nf-type=X and additional-nf-type=Y, then a profile with nfType=Z and addNfTypeList=Y, X may be included in response message 259. Likewise, if the query includes target-nf-type=X and additional-nf-type=Y, then a profile with nfType=Y and addNfTypeList=X, Z may be included in response message 259.

However, if the query includes target-nf-type=X and additional-nf-type=Y, then a profile with nfType=X and addNfTypeList=Z may not be included in response message 259. Likewise, as another example, if the query includes target-nf-type=X and additional-nf-type=Y, then a profile with nfType=Z and addNfTypeList=Y may not be included in response message 259.

If the query parameters of message 257 include the preferred-additional-nf-type value rather than the additional-nf-type value, then each profile included in response message 259 may be a profile for an NF instance that: 1) supports the NF type identified by the target-nf-type value and 2) also supports each NF type identified by the additional-nf-type value. However, each profile included in response message 259 must either: 1) have an nfType value that is identical to the target-nf-type value or 2) have an addNfTypeList value that includes an NF type identifier that is identical to the target-nf-type value.

Thus, for example, if the query includes target-nf-type=X and preferred-additional-nf-type=Y, then a first profile with nfType=X may be included in response message 259. Likewise, if the query includes target-nf-type=X and preferred-additional-nf-type=Y, then a second profile with nfType=Z and addNfTypeList=Y, X may be included in response message 259 and this second profile would be preferred over the first profile. For instance, if the response message includes an ordered array of profiles, the second profile would be positioned before the first profile in the ordered array of profiles (e.g., the second profile may be the first profile in the ordered array of profiles).

However, if the query includes target-nf-type=X and preferred-additional-nf-type=Y, then a profile with nfType=Y and addNfTypeList=Z may not be included in response message 259 because the NF instance associated with the profile does not support NF type X.

Table 3 of the appendix shows and describes IEs that may be included in the profiles that are included in response message 255 or response message 259.

Figure 3:
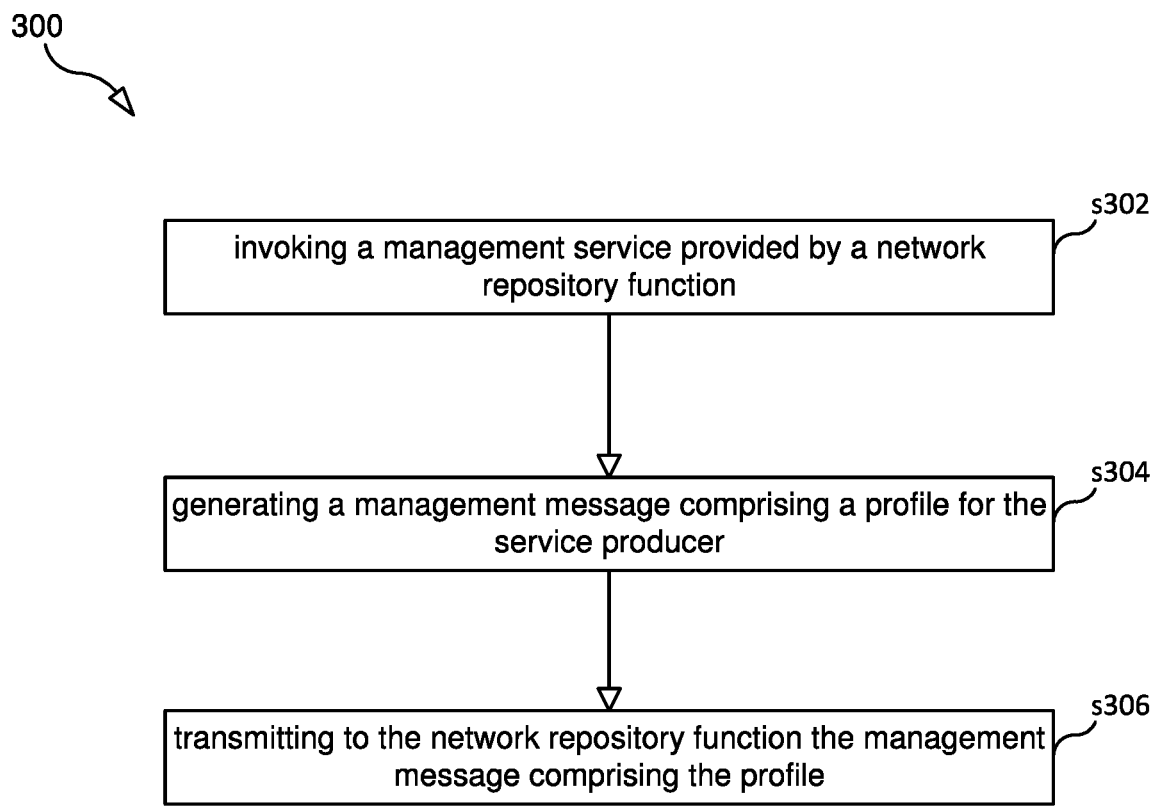
FIG. 3 is a flowchart illustrating a process according to an embodiment.

FIG. 3 is a flowchart illustrating a process 300 according to an embodiment. Process 300 is performed by NF 201 and may begin in step s302.

Step s302 comprises invoking a management service provided by a NRF 204. Invoking the management service includes generating a management message (e.g., message 251) comprising a profile for NF 201 (step s304) and transmitting to the NRF 204 the management message comprising the profile (step s306). The profile for NF 201 comprises NF type information indicating that the NF service producer is a combined NF. For example, the NF type information comprise: 1) an nfType value comprising an NF type identifier identifying a first NF type and 2) an addNfTypeList value that comprises one or more NF type identifiers identifying one or more other NF types. In some embodiments, the management message is an HTTP message (e.g., an HTTP PUT message).

In some embodiments, the NF type information included in the profile specifies that the NF service producer implements an NF of a first NF type and also implements an NF of a second NF type different than the first NF type.

In some embodiments, the NF type information comprises: a first NF type value identifying the first NF type; and a second NF type value identifying at least the second NF type. In some embodiments, the NF type information further comprises: a first attribute name, wherein the first NF type value is paired with the first attribute name; and a second attribute name, wherein the second NF type value is paired with the second attribute name. In some embodiments, the first attribute name is "nfType" and is a mandatory attribute of the profile. In some embodiments, the second NF type value is an array comprising an NF type identifier identifying the second NF type.

In some embodiments, the management message is transmitted either i) for an initial service registration or ii) for an update of a service registration.

In some embodiments, process 300 also includes receiving a response message 252 responsive to the management message, wherein the response message was transmitted by the NRF and the response message comprises a supported features value comprising information specifying that the NRF supports managing multiple NF types.

Figure 4:
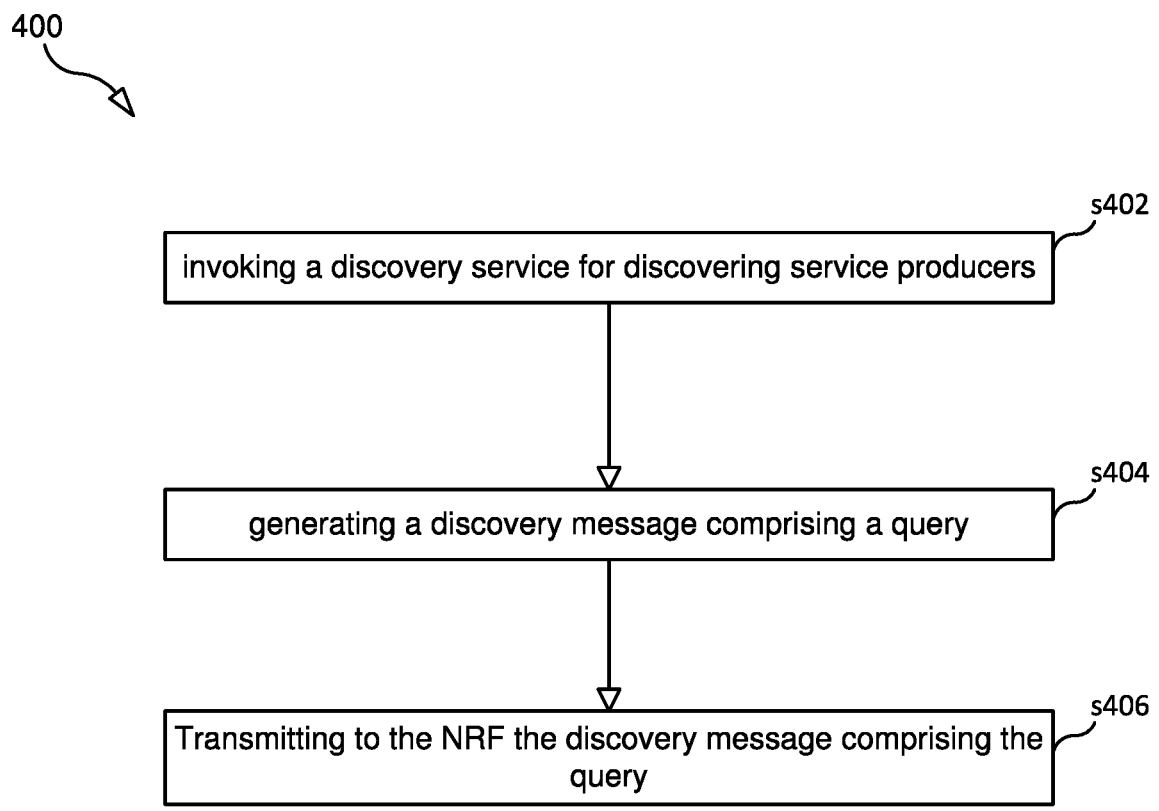
FIG. 4 is a flowchart illustrating a process according to an embodiment.

FIG. 4 is a flowchart illustrating a process 400 according to an embodiment. Process 400 is performed by NF service consumer 202 and may begin in step s402. Step s402 comprises invoking a discovery service for discovering service producers. Invoking the discovery service comprises: generating a discovery message (e.g., message 253 or 257) comprising a query (step s404) and transmitting to a network repository function the discovery message comprising the query (s406). In some embodiments, the discovery message is an HTTP GET message comprising the query.

The query included in the discovery message comprises a first query parameter comprising a first NF type value (e.g., the above described target-nf-type value) identifying an NF type of a target NF being discovered.

The query included in the discovery message further comprises at least one of: i) a second query parameter comprising a supported features value specifying that the NF service consumer invoking the discovery service supports selection of combined NFs, or ii) a third query parameter comprising a second NF type value identifying a set of one or more NF types. The third query parameter indicates either: a) that the NF service consumer prefers the NRF to return a set of NF instance profiles wherein each NF instance profile included in the set is for an NF instance that supports all of the NF types identified by the first and second NF type values or b) that the NF service consumer is requesting the NRF to only return a set of NF instance profiles wherein each NF instance profile included in the set is for an NF instance that supports all of the NF types identified by the first and second NF type values.

In some embodiments, the query includes both the second and the third query parameter. In some embodiments, the first query parameter further comprise a first attribute name, wherein the first NF type value is paired with the first attribute name, the second query parameter further comprise a second attribute name, wherein the supported features value is paired with the second attribute name, and the third query parameter further comprise a third attribute name, wherein the second NF type value is paired with the third attribute name. In some embodiments, the first attribute name is "target-nf-type" and is specified as a mandatory query parameter of the query, and the second attribute name is "requester-features." In some embodiments, the second NF type value is an array comprising one or more NF type identifiers.

In some embodiments, the query parameters further comprise a fourth query parameter identifying the NF type of the NF service consumer that invoked the discovery service (e.g., the fourth query parameter comprises a third NF type value that is paired with the name "requester-nf-type").

In some embodiments process 400 also includes: receiving from the NRF a response to the query, which response comprises a profile for an NF instance, wherein the profile for the NF instance matched the query, the profile for the NF instance comprises: a first NF type value identifying a first NF type supported by the NF instance and a second NF type value identifying at least a second NF type supported by the NF instance, the first NF type value included in the profile for the NF instance is different than the first NF type value included in the first query parameter, and the second NF type value included in the profile for the NF instance comprises an NF type identifier that is identical to the first NF type value included in the first query parameter. In some embodiments, the first NF type value included in the profile for the NF instance is paired with the name "nfType" in the profile.

In some embodiments, the query includes the third query parameter, and process 400 further includes: receiving from the NRF a response to the query, wherein the response to the query comprises an array of NF instance profiles comprising a first profile for a first NF instance and a second profile for a second NF instance, wherein the first profile for the first NF instance is positioned at the beginning of the array, and the first profile for the first NF instance comprises a first NF type value identifying a first NF type supported by the first NF instance and a second NF type value identifying at least a second NF type supported by the NF instance.

In some embodiments, the first NF type value included in the first profile for the first NF instance is identical to the first NF type value included in the first query parameter, and the second NF type value included in the first profile for the first NF instance comprises an NF type identifier that is identical to an NF type identifier included in the second NF type value of the third query parameter.

In some embodiments, the first NF type value included in the first profile for the first NF instance is identical to an NF type identifier included in the second NF type value of the third query parameter, and the second NF type value included in the first profile for the first NF instance comprises an NF type identifier that is identical to the first NF type value included in the first query parameter.

In some embodiments, the third query parameter indicates that the NF service consumer is requesting the NRF to only return a set of NF instance profiles wherein each NF instance profile included in the set is for an NF instance that supports all of the NF types identified by the first and second NF type values. In some embodiments, each profile included in the array of NF instance profiles is for an NF instance that supports all of the NF types identified by the first and second NF type values.

Figure 5:
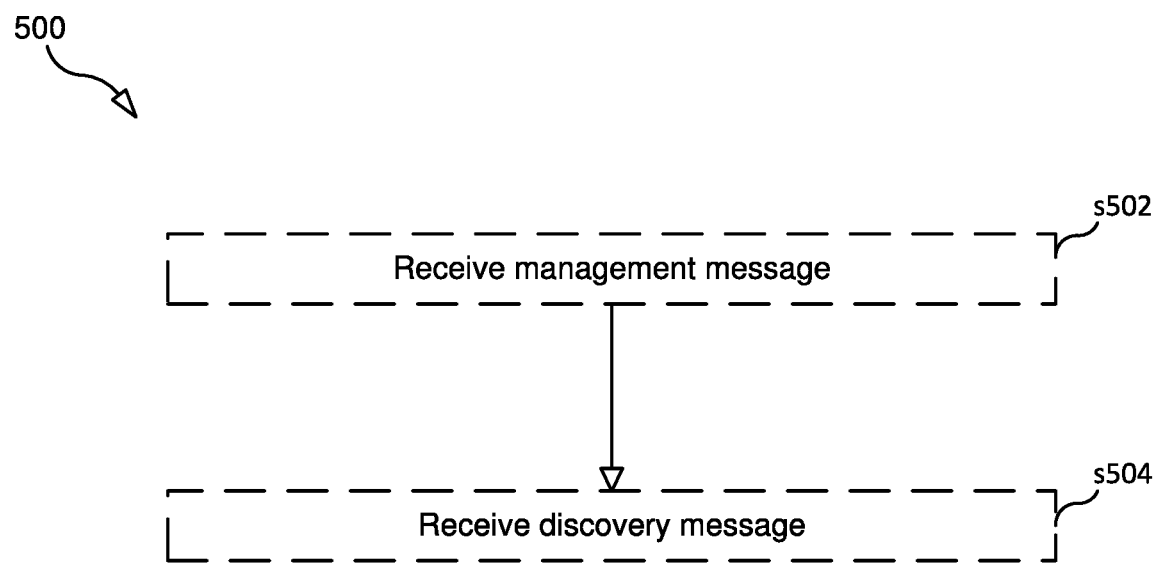
FIG. 5 is a flowchart illustrating a process according to an embodiment.

FIG. 5 is a flowchart illustrating a process 500 according to an embodiment. Process 500 is performed by NRF 204 and may include step s502 and/or step s504. Step s502 comprises the NRF receiving the management message 251. Step s504 comprises the NRF receiving a discovery message comprising a query (e.g., message 253 or 257). In some embodiments, the NRF receives the management message and stores the profile in a data repository. In some embodiments, the NRF receives the discovery message, and the NRF determines NF instances that satisfy the query included in the discovery message.

In some embodiments, the NRF receives the management message and stores the profile in a data repository.

In some embodiments, the NRF receives the discovery message comprising the query, and process 500 also includes, after receiving the discovery message, the NRF, based on the query parameters of the query included in the discovery message, determining whether or not to include a profile for an NF instance in an array of NF instance profiles, and the NRF transmitting to the NF service consumer a discovery response comprising the array of NF instance profiles. In some embodiments, the query includes the second query parameter, and the method further comprises determining, based one of the query parameters, that the NF service consumer invoking the discovery service supports selection of combined NFs.

In some embodiments, the profile for the NF instance comprises: a first NF type value identifying a first NF type supported by the NF instance and a second NF type value identifying at least a second NF type supported by the NF instance, and the NRF determines whether or not to include the profile for the NF instance in the array of NF instance profiles by performing a process that includes: determining whether the second NF type value included in the profile for the NF instance comprises an NF type identifier that is identical to the first NF type value included in the first query parameter. In some embodiments, the second NF type value is an array that comprises a plurality of different NF type identifiers.

In some embodiments, the query comprises the third query parameter.

In some embodiments, the NRF determines whether or not to include the profile for the NF instance in the array of NF instance profiles by performing a process that includes: determining whether a first NF type value included in the profile is identical to the first NF type value of the first query parameter; and, if it is determined that the first NF type value included in the profile is not identical to the first NF type value of the first query parameter, then: determining whether the first NF type value included in the profile is identical to an NF type identifier included in the second NF type value of the third query parameter; and determining whether a second NF type value included in the profile comprise an NF type identifier that is identical to the first NF type value of the first query parameter.

In some embodiment, the NF determines whether or not to include the profile for the NF instance in the array of NF instance profiles by performing a process that includes: determining whether a first NF type value included in the profile is identical to an NF type identifier included in the second NF type value of the third query parameter; and, if it is determined that the first NF type value included in the profile is not identical to any NF type identifier included in the second NF type value of the third query parameter, then determining whether the first NF type value included in the profile is identical to the first NF type value of the first query parameter.

In some embodiments, the NF determines whether or not to include the profile for the NF instance in the array of NF instance profiles by performing a process that includes determining whether the profile for the NF instance indicates that the NF instance supports all of the NF types identified by the first and second NF type values included in the query.

In some embodiments, the array of NF instance profiles comprises a first profile for a first NF instance and a second profile for a second NF instance, the first profile for the first NF instance is positioned at the beginning of the array, and the first profile for the first NF instance comprises a first NF type value identifying a first NF type supported by the first NF instance and a second NF type value identifying at least a second NF type supported by the NF instance. In some embodiments, the first NF type value included in the first profile for the first NF instance is identical to the first NF type value included in the first query parameter, and the second NF type value included in the first profile for the first NF instance comprises an NF type identifier that is identical to an NF type identifier included in the second NF type value of the third query parameter. In some embodiments, the first NF type value included in the first profile for the first NF instance is identical to an NF type identifier included in the second NF type value of the third query parameter, and the second NF type value included in the first profile for the first NF instance comprises an NF type identifier that is identical to the first NF type value included in the first query parameter.

Figure 6:
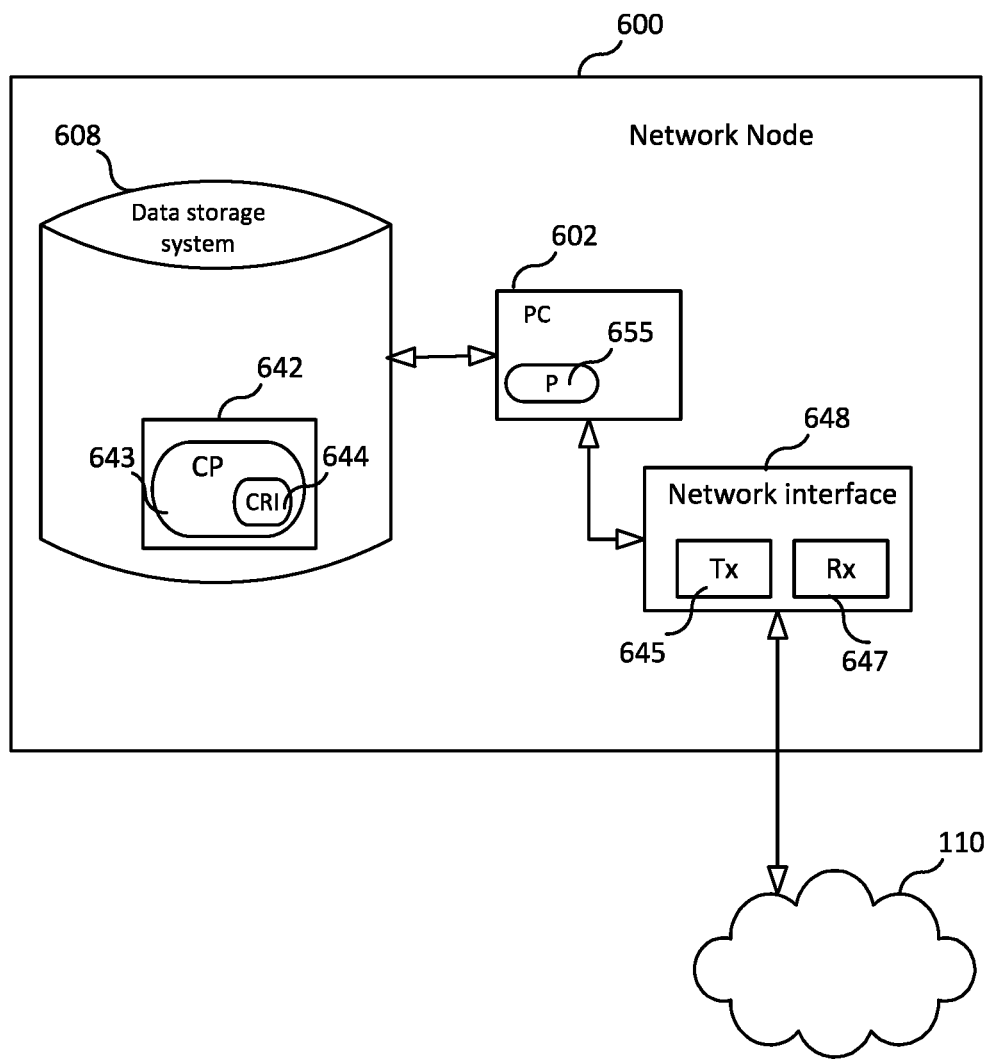
FIG. 6 illustrates a network node according to an embodiment.

FIG. 6 is a block diagram of a network node 600, according to some embodiments, which can be used to implement NF service producer 201, NF service consumer 202, and/or NRF 204. For instance, in embodiments where NF service producer 201, NF service consumer 202, and/or NRF 204 consists of software, network node 600 may run (or execute a virtual machine that runs) NF service producer 201, NF service consumer 202, and/or NRF 204. As shown in FIG. 6, network node 600 may comprise: processing circuitry (PC) 602, which may include one or more processors (P) 655 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., network node 600 may be a distributed computing apparatus); a network interface 648 comprising a transmitter (Tx) 645 and a receiver (Rx) 647 for enabling network node 600 to transmit data to and receive data from other machines connected to a network 110 (e.g., an Internet Protocol (IP) network) to which network interface 648 is connected (directly or indirectly) (e.g., network interface 648 may be wirelessly connected to the network 110, in which case network interface 648 is connected to an antenna arrangement); and a local storage unit (a.k.a., "data storage system") 608, which may include one or more non-volatile storage devices and/or one or more volatile storage devices. In embodiments where PC 602 includes a programmable processor, a computer readable storage medium (CRSM) 642 storing a computer program (CP) 643 comprising computer readable instructions (CRI) 644 may be provided. CRSM 642 may be a non-transitory computer readable medium, such as, magnetic media (e.g., a hard disk), optical media, memory devices (e.g., random access memory, flash memory), and the like. In some embodiments, the CRI 644 of computer program 643 is configured such that when executed by PC 602, the CRI causes network node 600 to perform steps described herein (e.g., steps described herein with reference to the flow charts). In other embodiments, network node 600 may be configured to perform steps described herein without the need for code. That is, for example, PC 602 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

APPENDIX

TABLE 1

| Attribute name | Data type | Cardinality | Description |
| --- | --- | --- | --- |
| nfInstanceId | NfInstanceId | 1 | Unique identity of the NF Instance. |
| nfType | NFType | 1 | Type of Network Function |
| addNfTypeList | array(NFType) | 1 . . . N | Additional NF type(s) supported by the NF (NOTE X) |
| nfStatus | NFStatus | 1 | Status of the NF Instance (NOTE 5) (NOTE 16) |
| nfInstanceName | string | 0 . . . 1 | Human readable name of the NF Instance |
| heartBeatTimer | integer | 0 . . . 1 | Time in seconds expected between 2 consecutive heart-beat messages from an NF Instance to the NRF. It may be included in the registration |

TABLE 1-continued

| Attribute name | Data type | Cardinality | Description |
|---|---|---|---|
| | | | request. When present in the request it shall contain the heartbeat time proposed by the NF service consumer. It shall be included in responses from NRF to registration requests (PUT) or in NF profile updates (PUT or PATCH). If the proposed heartbeat time is acceptable by the NRF based on the local configuration, it shall use the same value as in the registration request; otherwise the NRF shall override the value using a preconfigured value. |
| plmnList | array(PlmnId) | 1 . . . N | PLMN(s) of the Network Function (NOTE 7). This IE shall be present if this information is available for the NF. If not provided, PLMN ID(s) of the PLMN of the NRF are assumed for the NF. |
| snpnList | array(PlmnIdNid) | 1 . . . N | SNPN(s) of the Network Function. This IE shall be present if the NF pertains to one or more SNPNs. |
| sNssais | array(ExtSnssai) | 1 . . . N | S-NSSAIs of the Network Function. If not provided, and if the perPlmnSnssaiList attribute is not present, the NF can serve any S-NSSAI. When present this IE represents the list of S-NSSAIs supported in all the PLMNs listed in the plmnList IE. If the sNSSAIs attribute is provided in at least one NF Service, the S-NSSAIs supported by the NF Profile shall be the set or a superset of the S-NSSAIs of the NFService(s). |
| perPlmnSnssaiList | array(PlmnSnssai) | 1 . . . N | This IE may be included when the list of S-NSSAIs supported by the NF for each PLMN it is supporting is different. When present, this IE shall include the S-NSSAIs supported by the Network Function for each PLMN supported by the Network Function. When present, this IE shall override sNssais IE. (NOTE 9) If the perPlmnSnssaiList attribute is provided in at least one NF Service, the S-NSSAIs supported per PLMN in the NF Profile shall be the set or a superset of the perPlmnSnssaiList of the NFService(s). |
| nsiList | array(string) | 1 . . . N | NSI identities of the Network Function. If not provided, the NF can serve any NSI. |
| fqdn | Fqdn | 0 . . . 1 | FQDN of the Network Function (NOTE 1) (NOTE 2) (NOTE 18). For AMF, the FQDN registered with the NRF shall be that of the AMF Name (see 3GPP TS 23.003 [12] clause 28.3.2.5). |
| interPlmnFqdn | Fqdn | 0 . . . 1 | If the NF needs to be discoverable by other NFs in a different PLMN, then an FQDN that is used for inter-PLMN routing as specified in 3GPP TS 23.003 [12] shall be registered with the NRF (NOTE 8). A change of this attribute shall result in triggering a "NF_PROFILE_CHANGED" notification from NRF towards subscribing NFs located in the same or a different PLMN, but in the latter case the new value shall be notified as a change of the "fqdn" attribute. |
| ipv4Addresses | array(Ipv4Addr) | 1 . . . N | IPV4 address(es) of the Network Function (NOTE 1) (NOTE 2) (NOTE 18) |
| ipv6Addresses | array(Ipv6Addr) | 1 . . . N | IPV6 address(es) of the Network Function (NOTE 1) (NOTE 2) (NOTE 18) |
| allowedPlmns | array(PlmnId) | 1 . . . N | PLMNs allowed to access the NF instance. If not provided, any PLMN is allowed to access the NF. This attribute shall not be included in profile change notifications to subscribed NFs. (NOTE 17) |
| allowedSnpns | array(PlmnIdNid) | 1 . . . N | SNPNs allowed to access the NF instance. If this attribute is present in the NFService and in the NF profile, the attribute from the NFService shall prevail. The absence of this attribute in both the NFService and in the NF profile indicates that no SNPN, other than the SNPN(s) registered in the snpnList attribute of the NF Profile, is allowed to access the service instance. This attribute shall not be included in profile change notifications to subscribed NFs. (NOTE 17) |
| allowedNfTypes | array(NFType) | 1 . . . N | Type of the NFs allowed to access the NF instance. If not provided, any NF type is allowed to access the NF. This attribute shall not be included in profile change notifications to subscribed NFs. (NOTE 17) |
| allowedNfDomains | array(string) | 1 . . . N | Pattern (regular expression according to the ECMA-262 dialect [8]) representing the NF domain names within the PLMN of the NRF |

TABLE 1-continued

| Attribute name | Data type | Cardinality | Description |
|---|---|---|---|
| | | | allowed to access the NF instance. If not provided, any NF domain is allowed to access the NF. This attribute shall not be included in profile change notifications to subscribed NFs. (NOTE 17) |
| allowedNssais | array(ExtSnssai) | 1 . . . N | S-NSSAI of the allowed slices to access the NF instance. If not provided, any slice is allowed to access the NF. This attribute shall not be included in profile change notifications to subscribed NFs. (NOTE 17) |
| priority | integer | 0 . . . 1 | Priority (relative to other NFs of the same type) within the range 0 to 65535, to be used for NF selection; lower values indicate a higher priority. Priority may or may not be present in the nfServiceList parameters, xxxInfo parameters and in this attribute. Priority in the nfServiceList has precedence over the priority in this attribute (NOTE 4). Priority in xxxInfo parameter shall only be used to determine the relative priority among NF instances with the same priority at NFProfile/NFService. The NRF may overwrite the received priority value when exposing an NFProfile with the Nnrf_NFDiscovery service. |
| capacity | integer | 0 . . . 1 | Static capacity information within the range 0 to 65535, expressed as a weight relative to other NF instances of the same type; if capacity is also present in the nfServiceList parameters, those will have precedence over this value. (NOTE 4). |
| load | integer | 0 . . . 1 | Dynamic load information, within the range 0 to 100, indicates the current load percentage of the NF. |
| loadTimeStamp | DateTime | 0 . . . 1 | It indicates the point in time in which the latest load information (sent by the NF in the "load" attribute of the NF Profile) was generated at the NF Instance. If the NF did not provide a timestamp, the NRF should set it to the instant when the NRF received the message where the NF provided the latest load information. |
| locality | string | 0 . . . 1 | Operator defined information about the location of the NF instance (e.g. geographic location, data center) (NOTE 3) |
| udrInfo | UdrInfo | 0 . . . 1 | Specific data for the UDR (ranges of SUPI, group ID . . .) |
| udrInfoList | map(UdrInfo) | 1 . . . N | Multiple entries of UdrInfo. This attribute provides additional information to the udrInfo. udrInfoList may be present even if the udrInfo is absent. The key of the map shall be a (unique) valid JSON string per clause 7 of IETF RFC 8259 [22], with a maximum of 32 characters. |
| udmInfo | UdmInfo | 0 . . . 1 | Specific data for the UDM (ranges of SUPI, group ID . . .) |
| udmInfoList | map(UdmInfo) | 1 . . . N | Multiple entries of UdmInfo. This attribute provides additional information to the udmInfo. udmInfoList may be present even if the udmInfo is absent. The key of the map shall be a (unique) valid JSON string per clause 7 of IETF RFC 8259 [22], with a maximum of 32 characters. |
| ausfInfo | AusfInfo | 0 . . . 1 | Specific data for the AUSF (ranges of SUPI, group ID . . .) |
| ausfInfoList | map(AusfInfo) | 1 . . . N | Multiple entries of AusfInfo. This attribute provides additional information to the ausfInfo. ausfInfoList may be present even if the ausfInfo is absent. The key of the map shall be a (unique) valid JSON string per clause 7 of IETF RFC 8259 [22], with a maximum of 32 characters. |
| amfInfo | AmfInfo | 0 . . . 1 | Specific data for the AMF (AMF Set ID, . . .) |
| amfInfoList | map(AmfInfo) | 1 . . . N | Multiple entries of AmfInfo. This attribute provides additional information to the amfInfo. amfInfoList may be present even if the amfInfo is absent. The key of the map shall be a (unique) valid JSON string per clause 7 of IETF RFC 8259 [22], with a maximum of 32 characters. |
| smfInfo | SmfInfo | 0 . . . 1 | Specific data for the SMF (DNN's, . . .). (NOTE 12) |
| smfInfoList | map(SmfInfo) | 1 . . . N | Multiple entries of SmfInfo. This attribute provides additional information to the smfInfo. smfInfoList may be present even if the smfInfo is absent. The key of the map shall be a (unique) valid JSON string per clause 7 of IETF RFC 8259 [22], with a maximum of 32 characters. (NOTE 12) |

TABLE 1-continued

| Attribute name | Data type | Cardinality | Description |
| --- | --- | --- | --- |
| upfInfo | UpfInfo | 0 . . . 1 | Specific data for the UPF (S-NSSAI, DNN, SMF serving area, interface . . .) |
| upfInfoList | map(UpfInfo) | 1 . . . N | Multiple entries of UpfInfo. This attribute provides additional information to the upfInfo. upfInfoList may be present even if the upfInfo is absent. The key of the map shall be a (unique) valid JSON string per clause 7 of IETF RFC 8259 [22], with a maximum of 32 characters. |
| pcfInfo | PcfInfo | 0 . . . 1 | Specific data for the PCF |
| pcfInfoList | map(PcfInfo) | 1 . . . N | Multiple entries of PcfInfo. This attribute provides additional information to the pcfInfo. pcfInfoList may be present even if the pcfInfo is absent. The key of the map shall be a (unique) valid JSON string per clause 7 of IETF RFC 8259 [22], with a maximum of 32 characters. |
| bsfInfo | BsfInfo | 0 . . . 1 | Specific data for the BSF |
| bsfInfoList | map(BsfInfo) | 1 . . . N | Multiple entries of BsfInfo. This attribute provides additional information to the bsfInfo. bsfInfoList may be present even if the bsfInfo is absent. The key of the map shall be a (unique) valid JSON string per clause 7 of IETF RFC 8259 [22], with a maximum of 32 characters. |
| chfInfo | ChfInfo | 0 . . . 1 | Specific data for the CHF |
| chfInfoList | map(ChfInfo) | 1 . . . N | Multiple entries of ChfInfo. This attribute provides additional information to the chfInfo. chfInfoList may be present even if the chfInfo is absent. The key of the map shall be a (unique) valid JSON string per clause 7 of IETF RFC 8259 [22], with a maximum of 32 characters. |
| nefInfo | NefInfo | 0 . . . 1 | Specific data for the NEF |
| nrfInfo | NrfInfo | 0 . . . 1 | Specific data for the NRF |
| udsfInfo | UdsfInfo | 0 . . . 1 | Specific data for the UDSF |
| udsfInfoList | map(UdsfInfo) | 1 . . . N | Multiple entries of udsfInfo. This attribute provides additional information to the udsfInfo. udsfInfoList may be present even if the udsfInfo is absent. The key of the map shall be a (unique) valid JSON string per clause 7 of IETF RFC 8259 [22], with a maximum of 32 characters. |
| nwdafInfo | NwdafInfo | 0 . . . 1 | Specific data for the NWDAF. |
| nwdafInfoList | map(NwdafInfo) | 1 . . . N | Multiple entries of nwdafInfo. This attribute provides additional information to the nwdafInfo. nwdafInfoList may be present even if the nwdafInfo is absent. The key of the map shall be a (unique) valid JSON string per clause 7 of IETF RFC 8259 [22], with a maximum of 32 characters. |
| pcscfInfoList | map(PcscfInfo) | 1 . . . N | Specific data for the P-CSCF. The key of the map shall be a (unique) valid JSON string per clause 7 of IETF RFC 8259 [22], with a maximum of 32 characters. (NOTE 11) |
| hssInfoList | map(HssInfo) | 1 . . . N | Specific data for the HSS. The key of the map shall be a (unique) valid JSON string per clause 7 of IETF RFC 8259 [22], with a maximum of 32 characters. |
| customInfo | object | 0 . . . 1 | Specific data for custom Network Functions |
| recoveryTime | DateTime | 0 . . . 1 | Timestamp when the NF was (re)started (NOTE 5) (NOTE 6) |
| nfServicePersistence | boolean | 0 . . . 1 | true: If present, and set to true, it indicates that the different service instances of a same NF Service in this NF instance, supporting a same API version, are capable to persist their resource state in shared storage and therefore these resources are available after a new NF service instance supporting the same API version is selected by a NF Service Consumer (see 3GPP TS 23.527 [27]). false (default): Otherwise, it indicates that the NF Service Instances of a same NF Service are not capable to share resource state inside the NF Instance. |
| nfServices | array(NFService) | 1 . . . N | List of NF Service Instances. It shall include the services produced by the NF that can be discovered by other NFs, if any. (NOTE 15) This attribute is deprecated; the attribute "nfServiceList" should be used instead. |
| nfServiceList | map(NFService) | 1 . . . N | Map of NF Service Instances, where the "serviceInstanceId" attribute of the NFService object shall be used as the key of the map. (NOTE 15) It shall include the services produced by the NF that can be discovered by other NFs, if any. |

TABLE 1-continued

| Attribute name | Data type | Cardinality | Description |
| --- | --- | --- | --- |
| nfProfileChangesSupportInd | boolean | 0 . . . 1 | NF Profile Changes Support Indicator. See Annex B. This IE may be present in the NFRegister or NFUpdate (NF Profile Complete Replacement) request and shall be absent in the response. true: the NF Service Consumer supports receiving NF Profile Changes in the response. false (default): the NF Service Consumer does not support receiving NF Profile Changes in the response. Write-Only: true |
| nfProfileChangesInd | boolean | 0 . . . 1 | NF Profile Changes Indicator. See Annex B. This IE shall be absent in the request to the NRF and may be included by the NRF in NFRegister or NFUpdate (NF Profile Complete Replacement) response. true: the NF Profile contains NF Profile changes. false (default): complete NF Profile. Read-Only: true |
| defaultNotifi-cationSubscriptions | array(DefaultNotifi-cationSubscription) | 1 . . . N | Notification endpoints for different notification types. (NOTE 10) |
| lmfInfo | LmfInfo | 0 . . . 1 | Specific data for the LMF |
| gmlcInfo | GmlcInfo | 0 . . . 1 | Specific data for the GMLC |
| nfSetIdList | array(NfSetId) | 1 . . . N | NF Set ID defined in clause 28.12 of 3GPP TS 23.003 [12]. At most one NF Set ID shall be indicated per PLMN-ID or SNPN of the NF. This information shall be present if available. |
| servingScope | array(string) | 1 . . . N | The served area(s) of the NF instance. The absence of this attribute does not imply that the NF instance can serve every area in the PLMN. (NOTE 13) |
| lcHSupportInd | boolean | 0 . . . 1 | This IE indicates whether the NF supports Load Control based on LCI Header (see clause 6.3 of 3GPP TS 29.500 [4]). true: the NF supports the feature. false (default): the NF does not support the feature. |
| olcHSupportInd | boolean | 0 . . . 1 | This IE indicates whether the NF supports Overload Control based on OCI Header (see clause 6.4 of 3GPP TS 29.500 [4]). true: the NF supports the feature. false (default): the NF does not support the feature. |
| nfSetRecoveryTimeList | map(DateTime) | 1 . . . N | Map of recovery time, where the key of the map is the NfSetId of NF Set(s) that the NF instance belongs to. When present, the value of each entry of the map shall be the recovery time of the NF Set indicated by the key. |
| serviceSetRecoveryTimeList | map(DateTime) | 1 . . . N | Map of recovery time, where the key of the map is the NfServiceSetId of the NF Service Set(s) configured in the NF instance. When present, the value of each entry of the map shall be the recovery time of the NF Service Set indicated by the key. |
| scpDomains | array(string) | 1 . . . N | When present, this IE shall carry the list of SCP domains the SCP belongs to, or the SCP domain the NF (other than SCP) or the SEPP belongs to. (NOTE 14) |
| scpInfo | ScpInfo | 0 . . . 1 | Specific data for the SCP |
| seppInfo | SeppInfo | 0 . . . 1 | Specific data for the SEPP |
| vendorId | VendorId | 0 . . . 1 | Vendor ID of the NF instance, according to the IANA-assigned "SMI Network Management Private Enterprise Codes" [38]. |
| supportedVendorSpecificFeatures | map(array(VendorSpe-cificFeature)) | 1 . . . N(1 . . . M) | Map of Vendor-Specific features, where the key of the map is the IANA-assigned "SMI Network Management Private Enterprise Codes" [38]. The string used as key of the map shall contain 6 decimal digits; if the SMI code has less than 6 digits, it shall be padded with leading digits "0" to complete a 6-digit string value. The value of each entry of the map shall be a list (array) of VendorSpecificFeature objects. (NOTE 19) |
| aanfInfoList | map(AanfInfo) | 1 . . . N | Multiple entries of AanfInfo. The key of the map shall be a (unique) valid JSON string per clause 7 of IETF RFC 8259 [22], with a maximum of 32 characters. |
| 5gDdnmfInfo | 5GDdnmfInfo | 0 . . . 1 | Specific data for the 5G DDNMF (5G DDNMF ID, . . .) |
| mfafInfo | MfafInfo | 0 . . . 1 | Specific data for the MFAF |
| easdfInfoList | map(EasdfInfo) | 1 . . . N | EASDF specific data. The key of the map shall be a (unique) valid JSON string per clause 7 of IETF RFC 8259 [22], with a maximum of 32 characters. (NOTE 20) |

TABLE 1-continued

| Attribute name | Data type | Cardinality | Description |
|---|---|---|---|
| dccfInfo | DccfInfo | 0 . . . 1 | Specific data for the DCCF |
| nsacfInfoList | map(NsacfInfo) | 1 . . . N | Specific data for the NSACF. The key of the map shall be a (unique) valid JSON string per clause 7 of IETF RFC 8259 [22], with a maximum of 32 characters. |
| mbSmfInfoList | map(MbSmfInfo) | 1 . . . N | MB-SMF specific data. The key of the map shall be a (unique) valid JSON string per clause 7 of IETF RFC 8259 [22], with a maximum of 32 characters. |
| tsctsfInfoList | map(TsctsfInfo) | 1 . . . N | Specific data for the TSCTSF. The key of the map shall be a (unique) valid JSON string per clause 7 of IETF RFC 8259 [22], with a maximum of 32 characters. |
| . . . | | | |

NOTE X:
The NF type(s) registered in this IE are equvalient to the NF type registered in nfType IE for discovery, i.e. there is no precedence between the NF types registered in this IE and the NF type registered in nfType IE when NRF searching for candidate NF instances.

TABLE 2

| Name | Data type | Cardinality | Description |
|---|---|---|---|
| target-nf-type | NFType | 1 | This IE shall contain the NF type of the target NF being discovered. (NOTE X) |
| preferred-additional-nf-types | array(NFType) | 1 . . . N | The IE may be present to contain the desired additional NF type(s) when the NF service consumer wants to select a combo node supporting multiple NF types. (NOTE Y) |
| additional-nf-types | array(NFType) | 1 . . . N | The IE may be present to contain the required additional NF type(s) when the NF service consumer wants to select only combo nodes supporting all of the identified NF types. (NOTE Z) |
| requester-nf-type | NFType | 1 | This IE shall contain the NF type of the Requester NF that is invoking the Nnrf_NFDiscovery service. |
| requester-nf-instance-id | NfInstanceId | 0 . . . 1 | If included, this IE shall contain the NF instance id of the Requester NF. |
| service-names | array(ServiceName) | 1 . . . N | If included, this IE shall contain an array of service names for which the NRF is queried to provide the list of NF profiles. The NRF shall return the NF profiles that have at least one NF service matching the NF service names in this list. The NF services returned by the NRF (inside the nfServices or nfServiceList attributes) in each matching NFProfile shall be those services whose service name matches one of the service names included in this list. If not included, the NRF shall not filter based on service name. This array shall contain unique items. Example: NF1 supports services: A, B, C NF2 supports services: C, D, E NF3 supports services: A, C, E NF4 supports services: B, C, D Consumer asks for service-names = [A, E] NRF returns: NF1 containing service A NF2 containing service E NF3 containing services A, E NF4 is not returned |
| requester-nf-instance-fqdn | Fqdn | 0 . . . 1 | This IE may be present for an NF discovery request within the same PLMN as the NRF. If included, this IE shall contain the FQDN of the Requester NF that is invoking the Nnrf_NFDiscovery service. The NRF shall use this to return only those NF profiles that include at least one NF service containing an entry in the "allowedNfDomains" list (see clause 6.1.6.2.3) that matches the domain of the requester NF. This IE shall be ignored by the NRF if it is received from a requester NF belonging to a different PLMN. (NOTE 12) |
| target-plmn-list | array(PlmnId) | 1 . . . N | This IE shall be included when NF services in a different PLMN, or NF services of specific PLMN ID(s) in a same PLMN comprising multiple PLMN IDs, need to be discovered. When included, this IE shall contain the PLMN ID of the target NF. If more than one PLMN ID is included, NFs from any PLMN ID present in the list matches the query parameter. This IE shall also be included in SNPN scenarios, when the entity owning the subscription, the Credentials Holder (see clause 5.30.2.9 in 3GPP TS 23.501 [2]) is a PLMN. For inter-PLMN service discovery, at most 1 PLMN ID shall be included in the list; it shall be included in the service discovery from the NF in the source PLMN sent to the NRF in the same PLMN, while it may be absent in the service discovery request sent from the source NRF to the target NRF. In such case, if the NRF |

TABLE 2-continued

| Name | Data type | Cardinality | Description |
|---|---|---|---|
| requester-plmn-list | array(PlmnId) | 1 . . . N | receives more than 1 PLMN ID, it shall only consider the first element of the array, and ignore the rest.<br>This IE shall be included when NF services in a different PLMN need to be discovered. When included, this IE shall contain the PLMN ID(s) of the requester NF. (NOTE 12) |
| requester-snpn-list | array(PlmnIdNid) | 1 . . . N | This IE shall be included when the Requester NF belongs to one or several SNPNs, and NF services of a specific SNPN need to be discovered. When present, this IE shall contain the SNPN ID(s) of the requester NF. The NRF shall use this to return only those NF profiles of NF Instances allowing to be discovered from the SNPNs identified by this IE, according to the "allowedSnpns" list in the NF Profile and NF Service (see clauses 6.1.6.2.2 and 6.1.6.2.3). |
| target-nf-instance-id | NfInstanceId | 0 . . . 1 | Identity of the NF instance being discovered. |
| target-nf-fqdn | Fqdn | 0 . . . 1 | FQDN of the target NF instance being discovered. |
| hnrf-uri | Uri | 0 . . . 1 | If included, this IE shall contain the API URI of the NFDiscovery Service (see clause 6.2.1) of the home NRF. It shall be included if the Requester NF has previously received such API URI to be used for service discovery (e.g., from the NSSF in the home PLMN as specified in clause 6.1.6.2.11 of 3GPP TS 29.531 [42]). |
| snssais | array(Snssai) | 1 . . . N | If included, this IE shall contain the list of S-NSSAIs that are served by the NF (Service) Instances being discovered. The NRF shall return those NF profiles/NF services of NF (Service) Instances that have at least one of the S-NSSAIs in this list. The S-NSSAIs included in the NF profiles/NF services of NF (Service) Instances returned by the NRF shall be an interclause of the S-NSSAIs requested and the S-NSSAIs supported by those NF (Service) Instances. (NOTE 10) When the NF Profile of the NF Instances being discovered has defined the list of supported S-NSSAIs in the "perPlmnSnssaiList", the discovered NF Instances shall be those having any of the S-NSSAIs included in this "snssais" parameter in any of the PLMNs included in the "target-plmn-list" attribute, if present; if the "target-plmn-list" is not included, the NRF shall assume that the discovery request is for any of the PLMNs it supports. |
| requester-snssais | array(Snssai) | 1 . . . N | If included, this IE shall contain the list of S-NSSAI of the requester NF. If this IE is included in a service discovery in a different PLMN, the requester NF shall provide S-NSSAI values of the target PLMN, that correspond to the S-NSSAI values of the requester NF. The NRF shall use this to return only those NF profiles of NF Instances allowing to be discovered from at least one network slice identified by this IE, according to the "allowedNssais" list in the NF Profile and NF Service (see clause 6.1.6.2.2 and 6.1.6.2.3). (NOTE 12) |
| plmn-specific-snssai-list | array(PlmnSnssai) | 1 . . . N | If included, this IE shall contain the list of S-NSSAI that are served by the NF service being discovered for the corresponding PLMN provided. The NRF shall use this to identify the NF services that have registered their support for the S-NSSAIs for the corresponding PLMN given. The NRF shall return the NF profiles that have at least one S-NSSAI supported in any of the PLMNs provided in this list. The per PLMN list of S-NSSAIs included in the NF profile returned by the NRF shall be an interclause of the list requested and the list registered in the NF profile. (NOTE 10). |
| requester-plmn-specific-snssai-list | array(PlmnSnssai) | 1 . . . N | If included, this IE shall contain the list of S-NSSAI of the requester NF, for each of the PLMNs it supports. The NRF shall use this to return only those NF profiles of NF Instances allowing to be discovered from at least one network slice identified by this IE, according to the "allowedNssais" and "allowedPlmns" attributes in the NF Profile and NF Service (see clause 6.1.6.2.2 and 6.1.6.2.3). (NOTE 12) |
| nsi-list | array(string) | 1 . . . N | If included, this IE shall contain the list of NSI IDs that are served by the services being discovered. |
| dnn | Dnn | 0 . . . 1 | If included, this IE shall contain the DNN for which NF services serving that DNN is discovered. DNN may be included if the target NF type is e.g. "BSF", "SMF", "PCF", "PCSCF", "UPF", "EASDF", "TSCTSF" or "MB-SMF". The DNN shall contain the Network Identifier and it may additionally contain an Operator Identifier. (NOTE 11). If the Snssai(s) are also included, the NF services serving the DNN shall be available in the network slice(s) identified by the Snssai(s). |

TABLE 2-continued

| Name | Data type | Cardinality | Description |
|---|---|---|---|
| smf-serving-area | string | 0 . . . 1 | If included, this IE shall contain the serving area of the SMF. It may be included if the target NF type is "UPF". |
| tai | Tai | 0 . . . 1 | Tracking Area Identity. |
| amf-region-id | AmfRegionId | 0 . . . 1 | AMF Region Identity. |
| amf-set-id | AmfSetId | 0 . . . 1 | AMF Set Identity. |
| guami | Guami | 0 . . . 1 | Guami used to search for an appropriate AMF. (NOTE 1) |
| supi | Supi | 0 . . . 1 | If included, this IE shall contain the SUPI of the requester UE to search for an appropriate NF. SUPI may be included if the target NF type is e.g. "PCF", "CHF", "AUSF", "UDM" or "UDR". |
| ue-ipv4-address | Ipv4Addr | 0 . . . 1 | The IPV4 address of the UE for which a BSF or P-CSCF needs to be discovered. |
| ip-domain | string | 0 . . . 1 | The IPV4 address domain of the UE for which a BSF needs to be discovered. |
| ue-ipv6-prefix | Ipv6Prefix | 0 . . . 1 | The IPV6 prefix of the UE for which a BSF or P-CSCF needs to be discovered. |
| pgw-ind | boolean | 0 . . . 1 | When present, this IE indicates whether a combined SMF/PGW-C or a standalone SMF needs to be discovered. true: A combined SMF/PGW-C is requested to be discovered; false: A standalone SMF is requested to be discovered. (See NOTE 2) |
| pgw | Fqdn | 0 . . . 1 | If included, this IE shall contain the PGW FQDN which is used by the AMF to find the combined SMF/PGW-C. |
| pgw-ip | IpAddr | 0 . . . 1 | If included, this IE shall contain the PGW IP Address used by the AMF to find the combined SMF/PGW-C. |
| gpsi | Gpsi | 0 . . . 1 | If included, this IE shall contain the GPSI of the requester UE to search for an appropriate NF. GPSI may be included if the target NF type is "CHF", "PCF", "UDM" or "UDR". |
| external-group-identity | ExtGroupId | 0 . . . 1 | If included, this IE shall contain the external group identifier of the requester UE to search for an appropriate NF. This may be included if the target NF type is "UDM", "UDR" or "TSCTSF". |
| pfd-data | PfdData | 0 . . . 1 | When present, this IE shall contain the application identifiers and/or application function identifiers in PFD management. This may be included if the target NF type is "NEF". The NRF shall return those NEF instances which can provide the PFDs for at least one of the provided application identifiers, or for at least one of the provided application function identifiers. |
| data-set | DataSetId | 0 . . . 1 | Indicates the data set to be supported by the NF to be discovered. May be included if the target NF type is "UDR". |
| routing-indicator | string | 0 . . . 1 | Routing Indicator information that allows to route network signalling with SUCI (see 3GPP TS 23.003 [12]) to an AUSF, AAnF and UDM instance capable to serve the subscriber. May be included if the target NF type is "AUSF", "AANF" or "UDM". Pattern: "^[0-9]{1,4}$" |
| group-id-list | array(NfGroupId) | 1 . . . N | Identity of the group(s) of the NFs of the target NF type to be discovered. May be included if the target NF type is "UDR", "UDM", "HSS", "PCF", "AUSF" or "CHF". |
| dnai-list | array(Dnai) | 1 . . . N | If included, this IE shall contain the Data network access identifiers. It may be included if the target NF type is "UPF", "SMF", "EASDF" or "NEF". |
| upf-iwk-eps-ind | boolean | 0 . . . 1 | When present, this IE indicates whether a UPF supporting interworking with EPS needs to be discovered. true: A UPF supporting interworking with EPS is requested to be discovered; false: A UPF not supporting interworking with EPS is requested to be discovered. (NOTE 3) |
| chf-supported-plmn | PlmnId | 0 . . . 1 | If included, this IE shall contain the PLMN ID that a CHF supports (i.e., in the PlmnRange of ChfInfo attribute in the NFProfile). This IE may be included when the target NF type is "CHF". |
| preferred-locality | string | 0 . . . 1 | Preferred target NF location (e.g. geographic location, data center). When present, the NRF shall prefer NF profiles with a locality attribute that matches the preferred-locality. The NRF may return additional NFs in the response not matching the preferred target NF location, e.g. if no NF profile is found matching the preferred target NF location. The NRF should set a lower priority for any additional NFs on the response not matching the preferred target NF location than those matching the preferred target NF location. (NOTE 6) |
| access-type | AccessType | 0 . . . 1 | If included, this IE shall contain the Access type which is required to be supported by the target Network Function (i.e. SMF). |

TABLE 2-continued

| Name | Data type | Cardinality | Description |
|---|---|---|---|
| supported-features | SupportedFeatures | 0 . . . 1 | List of features required to be supported by the target Network Function. This IE may be present only if the service-names attribute is present and if it contains a single service-name. It shall be ignored by the NRF otherwise. (NOTE 4) |
| required-features | array(SupportedFeatures) | 1 . . . N | List of features required to be supported by the target Network Function, as defined by the supportedFeatures attribute in NFService (see clauses 6.1.6.2.3 and 6.2.6.2.4). This IE may be present only if the service-names attribute is present. When present, the required-features attribute shall contain as many entries as the number of entries in the service-names attribute. The nth entry in the required-features attribute shall correspond to the nth entry in the service-names attribute. An entry corresponding to a service for which no specific feature is required shall be encoded as "0". |
| complex-query | ComplexQuery | 0 . . . 1 | This query parameter is used to override the default logical relationship of query parameters. |
| limit | integer | 0 . . . 1 | Maximum number of NFProfiles to be returned in the response. Minimum: 1 |
| max-payload-size | integer | 0 . . . 1 | Maximum payload size (before compression, if any) of the response, expressed in kilo octets. When present, the NRF shall limit the number of NF profiles returned in the response such as to not exceed the maximum payload size indicated in the request. Default: 124. Maximum: 2000 (i.e. 2 Mo). |
| max-payload-size-ext | integer | 0 . . . 1 | Maximum payload size (before compression, if any) of the response, expressed in kilo octets. When present, the NRF shall limit the number of NF profiles returned in the response such as to not exceed the maximum payload size indicated in the request. This query parameter is used when the consumer supports payload size bigger than 2 million octets. Default: 124 |
| pdu-session-types | array(PduSessionType) | 1 . . . N | List of the PDU session type (s) requested to be supported by the target Network Function (i.e UPF). |
| event-id-list | array(EventId) | 1 . . . N | If present, this attribute shall contain the list of events requested to be supported by the Nnwdaf AnalyticsInfo Service, the NRF shall return NF which support all the requested events. |
| nwdaf-event-list | array(NwdafEvent) | 1 . . . N | If present, this attribute shall contain the list of events requested to be supported by the Nnwdaf_EventsSubscription service, the NRF shall return NF which support all the requested events. |
| atsss-capability | AtsssCapability | 0 . . . 1 | When present, this IE indicates the ATSSS capability of the target UPF needs to be supported. |
| upf-ue-ip-addr-ind | boolean | 0 . . . 1 | When present, this IE indicates whether a UPF supporting allocating UE IP addresses/prefixes needs to be discovered. true: a UPF supporting UE IP addresses/prefixes allocation is requested to be discovered; false: a UPF not supporting UE IP addresses/prefixes allocation is requested to be discovered. |
| client-type | ExternalClientType | 0 . . . 1 | When present, this IE indicates that NF(s) dedicatedly serving the specified Client Type needs to be discovered. This IE may be included when target NF Type is "LMF" and "GMLC". If no NF profile is found dedicatedly serving the requested client type, the NRF may return NF(s) not dedicatedly serving the request client type in the response. |
| lmf-id | LMFIdentification | 0 . . . 1 | When present, this IE shall contain LMF identification to be discovered. This may be included if the target NF type is "LMF". |
| an-node-type | AnNodeType | 0 . . . 1 | If included, this IE shall contain the AN Node type which is required to be supported by the target Network Function (i.e. LMF). |
| rat-type | RatType | 0 . . . 1 | If included, this IE shall contain the RAT type which is required to be supported by the target Network Function (i.e. LMF). |
| target-snpn | PlmnIdNid | 0 . . . 1 | This IE shall be included when NF services of a specific SNPN need to be discovered. When included, this IE shall contain the PLMN ID and NID of the target NF. This IE shall also be included in SNPN scenarios, when the entity owning the subscription, the Credentials Holder (see clause 5.30.2.9 in 3GPP TS 23.501 [2]) is an SNPN. |
| af-ee-data | AfEventExposureData | 0 . . . 1 | When present, this shall contain the application events, and optionally application function identifiers, application identifiers of the AF(s). This may be included if the target NF type is "NEF". |
| w-agf-info | WAgfInfo | 0 . . . 1 | If included, this IE shall contain the W-AGF identifiers of N3 terminations which is received by the SMF to find the combined W-AGF/UPF. |

TABLE 2-continued

| Name | Data type | Cardinality | Description |
| --- | --- | --- | --- |
| tngf-info | TngfInfo | 0 . . . 1 | If included, this IE shall contain the TNGF identifiers of N3 terminations which is received by the SMF to find the combined TNGF/UPF. |
| twif-info | TwifInfo | 0 . . . 1 | If included, this IE shall contain the TWIF identifiers of N3 terminations which is received by the SMF to find the combined TWIF/UPF. |
| target-nf-set-id | NfSetId | 0 . . . 1 | When present, this IE shall contain the target NF Set ID (as defined in clause 28.12 of 3GPP TS 23.003 [12]) of the NF instances being discovered. |
| target-nf-service-set-id | NfServiceSetId | 0 . . . 1 | When present, this IE shall contain the target NF Service Set ID (as defined in clause 28.13 of 3GPP TS 23.003 [12]) of the NF service instances being discovered. If this IE is provided together with the target-nf-set-id IE, the NRF shall return service instances of the NF Service Set indicated in the request and should additionally return equivalent ones, if any. |
| preferred-tai | Tai | 0 . . . 1 | When present, the NRF shall prefer NF profiles that can serve the TAI, or the NRF shall return NF profiles not matching the TAI if no NF profile is found matching the TAI. (NOTE 5) |
| nef-id | NefId | 0 . . . 1 | When present, this IE shall contain the NEF ID of the NEF to be discovered. This may be included if the target NF type is "NEF". (NOTE 7) |
| preferred-nf-instances | array(NfInstanceId) | 1 . . . A | When present, this IE shall contain a list of preferred candidate NF instance IDs. (NOTE 8) |
| notification-type | NotificationType | 0 . . . 1 | If included, this IE shall contain the notification type of default notification subscriptions that shall be registered in the NFProfile or NFService of the NF Instances being discovered. The NF profiles returned by the NRF shall contain all the registered default notification subscriptions, including the one corresponding to the notification-type parameter. (NOTE 9) |
| n1-msg-class | N1MessageClass | 0 . . . 1 | This IE may be included when "notification-type" IE is present with value "N1_MESSAGES". When included, this IE shall contain the N1 message class of default notification subscriptions that shall be registered in the NFProfile or NFService of the NF Instances being discovered. The NF profiles returned by the NRF shall contain all the registered default notification subscriptions, including the one corresponding to the n1-msg-class parameter. (NOTE 9) |
| n2-info-class | N2InformationClass | 0 . . . 1 | This IE may be included when "notification-type" IE is present with value "N2_INFORMATION". If included, this IE shall contain the notification type of default notification subscriptions that shall be registered in the NFProfile or NFService of the NF Instances being discovered. The NF profiles returned by the NRF shall contain all the registered default notification subscriptions, including the one corresponding to the n2-info-class parameter. (NOTE 9) |
| serving-scope | array(string) | 1 . . . N | If present, this attribute shall contain the list of areas that can be served by the NF instances to be discovered. The NRF shall return NF profiles of NFs which can serve all the areas requested in this query parameter. (NOTE 18) |
| imsi | string | 0 . . . 1 | If included, this IE shall contain the IMSI of the requester UE to search for an appropriate NF. IMSI may be included if the target NF type is "HSS". pattern: "?[0-9]{5, 15}$" |
| ims-private-identity | string | 0 . . . 1 | If included, this IE shall contain the IMS Private Identity of the requester UE to search for an appropriate NF. IMS Private Identity may be included if the target NF type is "HSS". |
| ims-public-identity | string | 0 . . . 1 | If included, this IE shall contain the IMS Public Identity of the requester UE to search for an appropriate NF. IMS Public Identity may be included if the target NF type is "HSS". |
| msisdn | string | 0 . . . 1 | If included, this IE shall contain the MSISDN of the requester UE to search for an appropriate NF. IMS Public Identity may be included if the target NF type is "HSS". |
| internal-group-identity | GroupId | 0 . . . 1 | If included, this IE shall contain the internal group identifier of the UE to search for an appropriate NF. This may be included if the target NF type is "UDM" |
| preferred-api-versions | map(string) | 1 . . . N | When present, this IE indicates the preferred API version of the services that are supported by the target NF instances. The key of the map is the ServiceName (see clause 6.1.6.3.11) for which the preferred API version is indicated. Each element carries the API Version Indication for the service indicated by the key. The NRF may return additional NFs in the response not matching the preferred API versions, e.g. if no NF profile is found matching the |

TABLE 2-continued

| Name | Data type | Cardinality | Description |
|---|---|---|---|
| | | | preferred-api-versions. An API Version Indication is a string formatted as {operator} + {API Version}. The following operators shall be supported: "=" match a version equals to the version value indicated. ">" match any version greater than the version value indicated ">=" match any version greater than or equal to the version value indicated "<" match any version less than the version value indicated "<=" match any version less than or equal to the version value indicated "A" match any version compatible with the version indicated, i.e. any version with the same major version as the version indicated. Precedence between versions is identified by comparing the Major, Minor, and Patch version fields numerically, from left to right. If no operator or an unknown operator is provided in API Version Indication, "=" operator is applied. Example of API Version Indication: Case1: "=1.2.4.operator-ext" or "1.2.4.operator-ext" means matching the service with API version "1.2.4.operator-ext" Case2: ">1.2.4" means matching the service with API versions greater than "1.2.4" Case3: "^2.3.0" or "^2" means matching the service with all API versions with major version "2". |
| v2x-support-ind | boolean | 0 . . . 1 | When present, this IE indicates whether a PCF supporting V2X Policy/Parameter provisioning needs to be discovered. true: a PCF supporting V2X Policy/Parameter provisioning is requested to be discovered; false: a PCF not supporting V2X Policy/Parameter provisioning is requested to be discovered. |
| redundant-gtpu | boolean | 0 . . . 1 | When present, this IE indicates whether a UPF supporting redundant GTP-U path needs to be discovered. true: a UPF supporting redundant GTP-U path is requested to be discovered; false: a UPF not supporting redundant GTP-U path is requested to be discovered. |
| redundant-transport | boolean | 0 . . . 1 | When present, this IE indicates whether a UPF supporting redundant transport path on the transport layer in the corresponding network slice needs to be discovered. true: a UPF supporting redundant transport path on the transport layer is requested to be discovered; false: a UPF not supporting redundant transport path on the transport layer is requested to be discovered. If the Snssai(s) are also included, the UPF supporting redundant transport path on the transport layer shall be available in the network slice(s) identified by the Snssai(s). |
| ipups | boolean | 0 . . . 1 | When present, this IE indicates whether a UPF which is configured for IPUPS is requested to be discovered. true: a UPF which is configured for IPUPS is requested to be discovered; false: a UPF which is not configured for IPUPS is requested to be discovered. |
| scp-domain-list | array(string) | 1 . . . N | When present, this IE shall contain the SCP domain(s) the target NF, SCP or SEPP belongs to. The NRF shall return NF, SCP or SEPP profiles that belong to all the SCP domains provided in this list. |
| address-domain | Fqdn | 0 . . . 1 | If included, this IE shall contain the address domain that shall be reachable through the SCP. This IE may be included when the target NF type is "SCP". |
| ipv4-addr | Ipv4Addr | 0 . . . 1 | If included, this IE shall contain the IPV4 address that shall be reachable through the SCP. This IE may be included when the target NF type is "SCP". |
| ipv6-prefix | Ipv6Prefix | 0 . . . 1 | If included, this IE shall contain the IPV6 prefix that shall be reachable through the SCP. This IE may be included when the target NF type is "SCP". |
| served-nf-set-id | NfSetId | 0 . . . 1 | When present, this IE shall contain the NF Set ID that shall be reachable through the SCP. This IE may be included when the target NF type is "SCP". |
| remote-plmn-id | PlmnId | 0 . . . 1 | If included, this IE shall contain the remote PLMN ID that shall be reachable through the SCP or SEPP. This IE may be included when the target NF type is "SCP" or "SEPP". |
| data-forwarding | boolean | 0 . . . 1 | This may be included if the target NF type is "UPF". (NOTE 13) When present, the IE indicates whether UPF(s) configured for data forwarding needs to be discovered. true: UPF(s) configured for data forwarding is requested to be discovered; false: UPF(s) not configured for data forwarding is requested to be discovered. |

TABLE 2-continued

| Name | Data type | Cardinality | Description |
| --- | --- | --- | --- |
| preferred-full-plmn | boolean | 0 . . . 1 | When present, the NRF shall prefer NF profile(s) that can serve the full PLMN (i.e. can serve any TAI in the PLMN), or the NRF shall return other NF profiles if no NF profile serving the full PLMN is found: true: NF instance(s) serving the full PLMN is preferred; false: NF instance(s) serving the full PLMN is not preferred. (NOTE 14) |
| requester-features | SupportedFeatures | 0 . . . 1 | Nnrf_NFDiscovery features supported by the Requester NF that is invoking the Nnrf_NFDiscovery service. This IE shall be included if at least one feature is supported by the Requester NF. |
| realm-id | string | 0 . . . 1 | May be included if the target NF type is "UDSF". If included, this IE shall contain the realm-id for which a UDSF shall be discovered. |
| storage-id | string | 0 . . . 1 | May be included if the target NF type is "UDSF" and realm-id is included. If included, this IE shall contain the storage-id for the realm-id indicated in the realm-id IE for which a UDSF shall be discovered. |
| vsmf-support-ind | boolean | 0 . . . 1 | If included, this IE shall indicate that target SMF(s) that support V-SMF Capability are preferred. This IE may be included when the target NF type is "SMF". (NOTE 15) |
| nrf-disc-uri | Uri | 0 . . . 1 | . . . |
| preferred-vendor-specific-features | map(map(array(VendorSpecificFeature))) | 1 . . . N(1 . . . M(1 . . . L)) | . . . |
| preferred-vendor-specific-nf-features | map(array(VendorSpecificFeature)) | 1 . . . N(1 . . . M) | —. |
| required-pfcp-features | string | 0 . . . 1 | List of features required to be supported by the target UPF (when selecting a UPF), encoded as defined for the supportedPfcpFeatures attribute in UpfInfo (see clause 6.1.6.2.13). (NOTE 16) |
| home-pub-key-id | integer | 0 . . . 1 | When present, this IE shall indicate the Home Network Public Key ID which shall be able to be served by the NF instance. May be included if the target NF type is "AUSF" or "UDM". (NOTE 17) |
| prose-support-ind | boolean | 0 . . . 1 | When present, this IE indicates whether supporting ProSe capability by PCF needs to be discovered. true: a PCF supporting ProSe capability is requested to be discovered; false: a PCF not ProSe capability is requested to be discovered. |
| analytics-aggregation-ind | boolean | 0 . . . 1 | If included, this IE shall contain the analytics aggregation capability indication of the NF being discovered. This IE may be included when the target NF type is "NWDAF". |
| analytics-metadata-prov-ind | boolean | 0 . . . 1 | If included, this IE shall contain the analytics metadata provisioning capability indication of the NF being discovered. This IE may be included when the target NF type is "NWDAF". |
| serving-nf-set-id | NfSetId | 0 . . . 1 | When present, this IE shall contain the NF Set ID that is served by the DCCF, NWDAF or MFAF. This IE may be included when the target NF type is "DCCF" or "NWDAF" or "MFAF". |
| serving-nf-type | NFType | 0 . . . 1 | When present, this IE shall contain the NF type that is served by the DCCF, NWDAF or MFAF. This IE may be included when the target NF type is "DCCF" or "NWDAF" or "MFAF". |
| ml-analytics-id-list | array(NwdafEvent) | 1 . . . N | If present, this attribute shall contain the list of analytics Id(s) requested to be supported by the Nnwdaf_MLModelProvision Service, the NRF shall return NF which support all the requested analytics Id(s). |
| nsacf-serving-area | string | 0 . . . 1 | If included, this IE shall contain the serving area of the NSACF. It may be included if the target NF type is "NSACF". |

TABLE 2-continued

| Name | Data type | Cardinality | Description |
| --- | --- | --- | --- |
| nsacf-capability | NsacfCapability | 0 . . . 1 | When present, this IE indicates the service capability that the target NSACF needs to support. |
| mbs-session-id-list | array(MbsSessionId) | 0 . . . 1 | —. |

NOTE X:
When looking for candidate NFs for a given target NF Type, if both the NF service consumer and the NRF support "Combo-NF-Selection" feature, the NRF shall return candidate NFs with either the nfType attribute or the addNfTypeList attribute contains the value of the target-nf-type; otherwise, the NRF shall return candidate NFs with the nfType attribute matching the target-nf-type.
NOTE Y:
If the NRF supports "Combo-NF-Selection" feature and the NF service consumer has included "preferred-additional-nf-type" attribute, the NRF shall prefer to return a list of candidates NFs with the supported NF types (as registered in nfType and addNfTypeList attributes) containing the requested target-nf-type and preferred-additional-nf-types.
NOTE Z:
If the NRF supports "Combo-NF-Selection" feature and the NF service consumer has included "additional-nf-type" attribute, the NRF shall return a list consisting only of candidates NFs that supports all of the NF types (as registered in nfType and addNfTypeList attributes) identified by the target-nf-type and additional-nf-types attributes.

TABLE 3

| Attribute name | Data type | Cardinality | Description |
| --- | --- | --- | --- |
| nfInstanceId | NfInstanceId | 1 | Unique identity of the NF Instance. |
| nfType | NFType | 1 | Type of Network Function |
| addNfTypeList | array(NFType) | 1 . . . N | Additional NF type(s) supported by the NF |
| nfStatus | NFStatus | 1 | Status of the NF Instance |
| nfInstanceName | string | 0 . . . 1 | Human readable name of the NF Instance |
| plmnList | array(PlmnId) | 1 . . . N | PLMN(s) of the Network Function (NOTE 5). This IE shall be present if this information is available for the NF. If this information was not provided by the NF during registration, the NRF should return the list of PLMN ID(s) of the PLMN of the NRF. If this IE is absent in the response, PLMN ID(s) of the PLMN of the NRF are assumed for the NF. |
| sNssais | array(ExtSnssai) | 1 . . . N | S-NSSAIs of the Network Function.BBGGXXIf not provided, and if the perPlmnSnssaiList attribute is not present, the NF can serve any S-NSSAI.BBGGXXIf the sNSSAIs attribute is provided in at least one NF Service, the sNssais attribute in the NF Profile shall be present and be the set or a superset of the sNSSAIs of the NFService(s). |
| perPlmnSnssaiList | array(PlmnSnssai) | 1 . . . N | The per-PLMN list of S-NSSAI(s) supported by the Network Function. BBGGXXIf the perPlmnSnssaiList attribute is provided in at least one NF Service, the perPlmnSnssaiList attribute in the NF Profile shall be present and be the set or a superset of the perPlmnSnssaiList of the NFService(s). |
| nsiList | array(string) | 1 . . . N | List of NSIs of the Network Function. BBGGXXIf not provided, the NF can serve any NSI. |
| fqdn | Fqdn | 0 . . . 1 | FQDN of the Network Function (NOTE 1, NOTE 3, NOTE 11) |
| interPlmnFqdn | Fqdn | 0 . . . 1 | If the requester-plmn-list query parameter is absent in the NF Discovery request, or if is present and the requester's PLMN is the same as the PLMN of the discovered NF, then this attribute shall be included by the NRF and it shall contain the interPlmnFqdn value registered by the NF during NF registration (see clause 6.1.6.2.2), if the interPlmnFqdn attribute was registered in the NF profile. BBGGXXThis attribute shall be absent if the requester-plmn in the query parameter is different from the PLMN of the discovered NF.BBGGXX(NOTE 3, NOTE 14) |
| ipv4Addresses | array(Ipv4Addr) | 1 . . . N | IPV4 address(es) of the Network Function (NOTE 1, NOTE 11) |
| ipv6Addresses | array(Ipv6Addr) | 1 . . . N | IPV6 address(es) of the Network Function (NOTE 1, NOTE 11) |
| capacity | integer | 0 . . . 1 | Static capacity information within the range 0 to 65535, expressed as a weight relative to other NF instances of the same type; if capacity is also present in the nfServiceList parameters, those will have precedence over this value. (See NOTE 2) |

TABLE 3-continued

| Attribute name | Data type | Cardinality | Description |
|---|---|---|---|
| load | integer | 0 . . . 1 | Latest known load information of the NF within the range 0 to 100 in percentage (See NOTE 4) |
| loadTimeStamp | DateTime | 0 . . . 1 | It indicates the point in time in which the latest load information of the NF Instance was sent from the NF to the NRF. |
| locality | string | 0 . . . 1 | Operator defined information about the location of the NF instance (e.g. geographic location, data center) |
| priority | integer | 0 . . . 1 | Priority (relative to other NFs of the same type) within the range 0 to 65535, to be used for NF selection; lower values indicate a higher priority. Priority may or may not be present in the nfServiceList parameters, xxxInfo parameters and in this attribute. Priority in the nfServiceList has precedence over the priority in this attribute.BBGGXX(NOTE 2)BBGGXXBBGGXXPriority in xxxInfo parameter shall only be used to determine the relative priority among NF instances with the same priority at NFProfile/NFService. |
| udrInfo | UdrInfo | 0 . . . 1 | Specific data for the UDR (ranges of SUPI, . . .) |
| udrInfoList | map(UdrInfo) | 1 . . . N | Multiple entries of UdrInfo. This attribute provides additional information to the udrInfo. udrInfoList may be present even if the udrInfo is absent. BBGGXXThe key of the map shall be a (unique) valid JSON string per clause 7 of IETF RFC 8259 [22], with a maximum of 32 characters. |
| udmInfo | UdmInfo | 0 . . . 1 | Specific data for the UDM |
| udmInfoList | map(UdmInfo) | 1 . . . N | Multiple entries of UdmInfo. This attribute provides additional information to the udmInfo. udmInfoList may be present even if the udmInfo is absent. BBGGXXThe key of the map shall be a (unique) valid JSON string per clause 7 of IETF RFC 8259 [22], with a maximum of 32 characters. |
| ausfInfo | AusfInfo | 0 . . . 1 | Specific data for the AUSF |
| ausfInfoList | map(AusfInfo) | 1 . . . N | Multiple entries of AusfInfo. This attribute provides additional information to the ausfInfo. ausfInfoList may be present even if the ausfInfo is absent.BBGGXXThe key of the map shall be a (unique) valid JSON string per clause 7 of IETF RFC 8259 [22], with a maximum of 32 characters. |
| amfInfo | AmfInfo | 0 . . . 1 | Specific data for the AMF (AMF Set ID, . . .) |
| amfInfoList | map(AmfInfo) | 1 . . . N | Multiple entries of AmfInfo. This attribute provides additional information to the amfInfo. amfInfoList may be present even if the amfInfo is absent. BBGGXXThe key of the map shall be a (unique) valid JSON string per clause 7 of IETF RFC 8259 [22], with a maximum of 32 characters. |
| smfInfo | SmfInfo | 0 . . . 1 | Specific data for the SMF (DNN's, . . .). BBGGXX(NOTE 8) |
| smfInfoList | map(SmfInfo) | 1 . . . N | Multiple entries of SmfInfo. This attribute provides additional information to the smfInfo. smfInfoList may be present even if the smfInfo is absent. BBGGXXThe key of the map shall be a (unique) valid JSON string per clause 7 of IETF RFC 8259 [22], with a maximum of 32 characters.BBGGXX(NOTE 8) |
| upfInfo | UpfInfo | 0 . . . 1 | Specific data for the UPF (S-NSSAI, DNN, SMF serving area, . . .) |
| upfInfoList | map(UpfInfo) | 1 . . . N | Multiple entries of UpfInfo. This attribute provides additional information to the upfInfo. upfInfoList may be present even if the upfInfo is absent. BBGGXXThe key of the map shall be a (unique) valid JSON string per clause 7 of IETF RFC 8259 [22], with a maximum of 32 characters. |
| pcfInfo | PcfInfo | 0 . . . 1 | Specific data for the PCF |
| pcfInfoList | map(PcfInfo) | 1 . . . N | Multiple entries of PcfInfo. This attribute provides additional information to the pcfInfo. pcfInfoList may be present even if the pcfInfo is absent. BBGGXXThe key of the map shall be a (unique) valid JSON string per clause 7 of IETF RFC 8259 [22], with a maximum of 32 characters. |

TABLE 3-continued

| Attribute name | Data type | Cardinality | Description |
|---|---|---|---|
| bsfInfo | BsfInfo | 0 . . . 1 | Specific data for the BSF |
| bsfInfoList | map(BsfInfo) | 1 . . . N | Multiple entries of BsfInfo. This attribute provides additional information to the bsfInfo. bsfInfoList may be present even if the bsfInfo is absent. BBGGXXThe key of the map shall be a (unique) valid JSON string per clause 7 of IETF RFC 8259 [22], with a maximum of 32 characters. |
| chfInfo | ChfInfo | 0 . . . 1 | Specific data for the CHF |
| chfInfoList | map(ChfInfo) | 1 . . . N | Multiple entries of ChfInfo. This attribute provides additional information to the chfInfo. chfInfoList may be present even if the chfInfo is absent. BBGGXXThe key of the map shall be a (unique) valid JSON string per clause 7 of IETF RFC 8259 [22], with a maximum of 32 characters. |
| udsfInfo | UdsfInfo | 0 . . . 1 | Specific data for the UDSF |
| udsfInfoList | map(UdsfInfo) | 1 . . . N | Multiple entries of udsfInfo. This attribute provides additional information to the udsfInfo. udsfInfoList may be present even if the udsfInfo is absent.BBGGXXThe key of the map shall be a (unique) valid JSON string per clause 7 of IETF RFC 8259 [22], with a maximum of 32 characters. |
| nefInfo | NefInfo | 0 . . . 1 | Specific data for the NEF |
| nwdafInfo | NwdafInfo | 0 . . . 1 | Specific data for the NWDAF |
| nwdafInfoList | map(NwdafInfo) | 1 . . . N | Multiple entries of nwdafInfo. This attribute provides additional information to the nwdafInfo. nwdafInfoList may be present even if the nwdafInfo is absent.BBGGXXThe key of the map shall be a (unique) valid JSON string per clause 7 of IETF RFC 8259 [22], with a maximum of 32 characters. |
| pcscfInfoList | map(PcscfInfo) | 1 . . . N | Specific data for the P-CSCF.BBGGXX. The key of the map shall be a (unique) valid JSON string per clause 7 of IETF RFC 8259 [22], with a maximum of 32 characters.BBGGXX(NOTE 7) |
| hssInfoList | map(HssInfo) | 1 . . . N | Specific data for the HSS.BBGGXX. The key of the map shall be a (unique) valid JSON string per clause 7 of IETF RFC 8259 [22], with a maximum of 32 characters. |
| customInfo | object | 0 . . . 1 | Specific data for custom Network Functions |
| recoveryTime | DateTime | 0 . . . 1 | Timestamp when the NF was (re)started |
| nfServicePersistence | boolean | 0 . . . 1 | true: If present, and set to true, it indicates that the different service instances of a same NF Service in the NF instance, supporting a same API version, are capable to persist their resource state in shared storage and therefore these resources are available after a new NF service instance supporting the same API version is selected by a NF Service Consumer (see 3GPP TS 23.527 [27]).BBGGXXBBGGXX- false (default): Otherwise, it indicates that the NF Service Instances of a same NF Service are not capable to share resource state inside the NF Instance. |
| nfServices | array(NFService) | 1 . . . N | List of NF Service Instances.BBGGXX(NOTE 10)BBGGXXBBGGXX. This attribute is deprecated; the attribute "nfServiceList" should be used instead. |
| nfServiceList | map(NFService) | 1 . . . N | Map of NF Service Instances, where the "serviceInstanceId" attribute of the NFService object shall be used as the key of the map.BBGGXX(NOTE 10) |
| defaultNotificationSubscriptions | array(DefaultNotificationSubscription) | 1 . . . N | Notification endpoints for different notification types.BBGGXX(NOTE 6)BBGGXX(See also NOTE 10 in clause 6.1.6.2.2) |
| lmfInfo | LmfInfo | 0 . . . 1 | Specific data for the LMF |
| gmlcInfo | GmlcInfo | 0 . . . 1 | Specific data for the GMLC |
| snpnList | array(PlmnIdNid) | 1 . . . N | SNPN(s) of the Network Function.BBGGXX. This IE shall be present if the NF pertains to one or more SNPNs. |
| nfSetIdList | array(NfSetId) | 1 . . . N | NF Set ID defined in clause 28.12 of 3GPP TS 23.003 [12].BBGGXXAt most one NF Set ID shall be indicated per PLMN-ID or SNPN of the NF.BBGGXX. This information shall be present if available. |

TABLE 3-continued

| Attribute name | Data type | Cardinality | Description |
|---|---|---|---|
| servingScope | array(string) | 1 . . . N | The served area(s) of the NF instance. BBGGXX. The absence of this attribute does not imply the NF instance can serve every area. |
| lcHSupportInd | boolean | 0 . . . 1 | This IE indicates whether the NF supports Load Control based on LCI Header (see clause 6.3 of 3GPP TS 29.500 [4]).BBGGXX true: the NF supports the feature.BBGGXX false (default): the NF does not support the feature. |
| olcHSupportInd | boolean | 0 . . . 1 | This IE indicates whether the NF supports Overload Control based on OCI Header (see clause 6.4 of 3GPP TS 29.500 [4]).BBGGXX true: the NF supports the feature. BBGGXX false (default): the NF does not support the feature. |
| nfSetRecoveryTimeList | map(Date Time) | 1 . . . N | Map of recovery time, where the key of the map is the NfSetId of NF Set(s) that the NF instance belongs to.BBGGXXBBGGXX. When present, the value of each entry of the map shall be the recovery time of the NF Set indicated by the key. |
| serviceSetRecovery TimeList | map(Date Time) | 1 . . . N | Map of recovery time, where the key of the map is the NfServiceSetId of the NF Service Set(s) configured in the NF instance.BBGGXXBBGGXX. When present, the value of each entry of the map shall be the recovery time of the NF Service Set indicated by the key. |
| scpDomains | array(string) | 1 . . . N | When present, this IE shall carry the list of SCP domains the SCP belongs to, or the SCP domain the NF (other than SCP) or the SEPP belongs to.BBGGXX(NOTE 9) |
| scpInfo | ScpInfo | 0 . . . 1 | Specific data for the SCP |
| seppInfo | SeppInfo | 0 . . . 1 | Specific data for the SEPP |
| vendorId | VendorId | 0 . . . 1 | Vendor ID of the NF instance, according to the IANA-assigned "SMI Network Management Private Enterprise Codes" [38]. |
| supportedVendorSpecificFeatures | map(array(VendorSpecificFeature)) | 1 . . . N(1 . . . M) | Map of Vendor-Specific features, where the key of the map is the IANA-assigned "SMI Network Management Private Enterprise Codes" [38]. The string used as key of the map shall contain 6 decimal digits; if the SMI code has less than 6 digits, it shall be padded with leading digits "0" to complete a 6-digit string value. BBGGXXThe value of each entry of the map shall be a list (array) of VendorSpecificFeature objects.BBGGXX(NOTE 12) |
| aanfInfoList | map(AanfInfo) | 1 . . . N | Specific data for the AAnF.BBGGXX. The key of the map shall be a (unique) valid JSON string per clause 7 of IETF RFC 8259 [22], with a maximum of 32 characters. |
| mfafInfo | MfafInfo | 0 . . . 1 | Specific data for the MFAF |
| easdfInfoList | map(EasdfInfo) | 1 . . . N | Specific data for the EASDFBBGGXX. The key of the map shall be a (unique) valid JSON string per clause 7 of IETF RFC 8259 [22], with a maximum of 32 characters.BBGGXX(NOTE 13) |
| dccfInfo | DccfInfo | 0 . . . 1 | Specific data for the DCCF |
| nsacfInfoList | map(NsacfInfo) | 1 . . . A | Specific data for the NSACF.BBGGXX. The key of the map shall be a (unique) valid JSON string per clause 7 of IETF RFC 8259 [22], with a maximum of 32 characters. |
| mbSmfInfoList | map(MbSmfInfo) | 1 . . . A | MB-SMF specific dataBBGGXX. The key of the map shall be a (unique) valid JSON string per clause 7 of IETF RFC 8259 [22], with a maximum of 32 characters. |
| tsctsfInfoList | map(TsctsfInfo) | 1 . . . A | Specific data for the TSCTSFBBGGXX. The key of the map shall be a (unique) valid JSON string per clause 7 of IETF RFC 8259 [22], with a maximum of 32 characters. |

The invention claimed is:

1. A method performed by a network function (NF) service consumer, the method comprising:
invoking a discovery service for discovering NF service producers, wherein invoking the discovery service comprises:
generating a discovery message comprising a query; and
transmitting to an NF repository function (NRF), the discovery message comprising the query, wherein
the query included in the discovery message comprises:
a set of one or more discovery query parameter including at least a first discovery query parameter indicating a target NF type of a target NF being discovered, and
a set of one more preferential query parameters including at least a preferential NF type query parameter indicating a set of one or more NF types that candidate NFs should preferentially support and further indicating that the NRF shall return a list of candidates NFs matching the discovery query parameters, including the first discovery query parameter indicating the target NF type being discovered, and preferentially supporting NF type(s) as indicated in the preferential NF type query parameter, wherein
the preferential NF type query parameter is separate from the first discovery query parameter indicating the target NF type.

2. The method of claim 1, wherein
the first discovery query parameter further comprise a first attribute name, wherein an NF type value specifying the target NF type is paired with the first attribute name.

3. The method of claim 1, wherein
the preferential NF type query parameter indicates a set of two or more NF types.

4. The method of claim 1, wherein the query parameters further comprise a query parameter identifying the NF type of the NF service consumer that invoked the discovery service.

5. The method of claim 1, further comprising:
receiving from the NRF a response to the query, which response comprises a profile for an NF instance, wherein
the profile for the NF instance matched the query,
the profile for the NF instance comprises: a first NF type value identifying a first NF type supported by the NF instance and a second NF type value identifying at least a second NF type supported by the NF instance.

6. The method of claim 5, wherein
the first NF type value included in the profile for the NF instance is different than an NF type value included in the first discovery query parameter, and
the second NF type value included in the profile for the NF instance comprises an NF type identifier that identifies the target NF type.

7. The method of claim 1, wherein
the method further comprises:
receiving from the NRF a response to the query, wherein
the response to the query comprises an array of NF instance profiles comprising a first profile for a first NF instance and a second profile for a second NF instance, wherein
the first profile for the first NF instance comprises a first NF type value identifying a first NF type supported by the first NF instance and a second NF type value identifying at least a second NF type supported by the NF instance.

8. The method of claim 7, wherein
the first NF type value included in the first profile for the first NF instance is identical to an NF type value included in the first query parameter.

9. A method performed by a network repository function (NRF), the method comprising:
receiving a discovery message comprising a query, wherein
the query included in the discovery message comprises:
a set of one or more discovery query parameter including at least a first discovery query parameter indicating a target NF type of a target NF being discovered, and
a set of one more preferential query parameters including at least a preferential NF type query parameter indicating a set of one or more NF types that candidate NFs should preferentially support and further indicating that the NRF shall return a list of candidates NFs matching the discovery query parameters, including the first discovery query parameter indicating the target NF type being discovered, and preferentially supporting NF type(s) as indicated in the preferential NF type query parameter, wherein
the preferential NF type query parameter is separate from the first discovery query parameter indicating the target NF type.

10. The method of claim 9, wherein
the method further comprises, after receiving the discovery message, the NRF, based on the query parameters included in the discovery message, determining whether or not to include a profile for an NF instance in an array of NF instance profiles and the NRF transmitting a discovery response comprising the array of NF instance profiles to the NF service consumer.

11. The method of claim 9, wherein
the method further comprises, after receiving the discovery message, the NRF, based on the query parameters included in the discovery message, determining whether or not to include a profile for an NF instance in an array of NF instance profiles and the NRF transmitting a discovery response comprising the array of NF instance profiles to the NF service consumer,
the profile for the NF instance comprises: a first NF type value identifying a first NF type supported by the NF instance and a second NF type value identifying at least a second NF type supported by the NF instance, and
the NRF determines whether or not to include the profile for the NF instance in the array of NF instance profiles by performing a process that includes:
determining whether the second NF type value included in the profile for the NF instance comprises an NF type identifier that is identical to an NF type value included in the first discovery query parameter.

12. The method of claim 10, wherein
the NRF determines whether or not to include the profile for the NF instance in the array of NF instance profiles by performing a process that includes:
determining whether a first NF type value included in the profile is identical to an NF type value of the first discovery query parameter; and
if it is determined that the first NF type value included in the profile is not identical to the NF type value of the first discovery query parameter, then:
determining whether the first NF type value included in the profile is identical to an NF type identifier included in the preferential NF type query parameter; and determining whether a second NF type value included in the profile comprise an NF type identifier that is identical to the first NF type value of the first discovery query parameter.

13. The method of claim 9, wherein
the method further comprises, after receiving the discovery message, the NRF, based on the query parameters included in the discovery message, determining whether or not to include a profile for an NF instance in an array of NF instance profiles and the NRF transmitting a discovery response comprising the array of NF instance profiles to the NF service consumer, and
the NF determines whether or not to include the profile for the NF instance in the array of NF instance profiles by performing a process that includes:
determining whether a first NF type value included in the profile is identical to an NF type identifier included in the preferential NF type query parameter; and
if it is determined that the first NF type value included in the profile is not identical to any NF type identifier included in the preferential NF type query parameter, then determining whether the first NF type value included in the profile is identical to and NF type value of the first discovery query parameter.

14. The method of claim 9, wherein
the method further comprises, after receiving the discovery message, the NRF, based on the query parameters included in the discovery message, determining whether or not to include a profile for an NF instance in an array of NF instance profiles and the NRF transmitting a discovery response comprising the array of NF instance profiles to the NF service consumer, and
the NF determines whether or not to include the profile for the NF instance in the array of NF instance profiles by performing a process that includes determining whether the profile for the NF instance indicates that the NF instance supports all of the NF types identified by the preferential NF type query parameter.

15. The method of claim 9, wherein
the method further comprises, after receiving the discovery message, the NRF, based on the query parameters included in the discovery message, determining whether or not to include a profile for an NF instance in an array of NF instance profiles and the NRF transmitting a discovery response comprising the array of NF instance profiles to the NF service consumer,
the array of NF instance profiles comprises a first profile for a first NF instance and a second profile for a second NF instance, and
the first profile for the first NF instance comprises a first NF type value identifying a first NF type supported by the first NF instance and a second NF type value identifying at least a second NF type supported by the NF instance.

16. A network function (NF) service consumer, comprising:
processing circuitry; and
a memory containing instructions executable by the processing circuitry, wherein the network node is configured to perform a method comprising:
invoking a discovery service for discovering NF service producers, wherein invoking the discovery service comprises:
generating a discovery message comprising a query; and
transmitting to an NF repository function (NRF), the discovery message comprising the query, wherein
the query included in the discovery message comprises:
  a set of one or more discovery query parameter including at least a first discovery query parameter indicating a target NF type of a target NF being discovered, and
  a set of one more preferential query parameters including at least a preferential NF type query parameter indicating a set of one or more NF types that candidate NFs should preferentially support and further indicating that the NRF shall return a list of candidates NFs matching the discovery query parameters, including the first discovery query parameter indicating the target NF type being discovered, and preferentially supporting NF type(s) as indicated in the preferential NF type query parameter, wherein
the preferential NF type query parameter is separate from the first discovery query parameter indicating the target NF type.

* * * * *